United States Patent
Zhang et al.

(10) Patent No.: US 10,619,758 B2
(45) Date of Patent: Apr. 14, 2020

(54) METHODS AND APPARATUS FOR AUTOMATICALLY DETECTING THE FAILURE CONFIGURATION OF A PNEUMATIC ACTUATOR

(71) Applicant: Emerson Process Management, Valve Automation, Inc., Houston, TX (US)

(72) Inventors: Toni Zhang, Shenzhen (CN); Edwin Schreuder, Enschede (NL); Harry Hobert, Henglo (NL); Eric Yuan, Shenzhen (CN)

(73) Assignee: EMERSON PROCESS MANAGEMENT, VALVE AUTOMATION, INC., Houston, TX (US)

( * ) Notice: Subject to any disclaimer, the term of this patent is extended or adjusted under 35 U.S.C. 154(b) by 411 days.

(21) Appl. No.: 15/532,462

(22) PCT Filed: Mar. 3, 2016

(86) PCT No.: PCT/CN2016/075482
§ 371 (c)(1),
(2) Date: Jun. 1, 2017

(87) PCT Pub. No.: WO2017/147846
PCT Pub. Date: Sep. 8, 2017

(65) Prior Publication Data
US 2018/0094746 A1 Apr. 5, 2018

(51) Int. Cl.
*F16K 31/42* (2006.01)
*F15B 15/06* (2006.01)
(Continued)

(52) U.S. Cl.
CPC .............. *F16K 31/42* (2013.01); *F15B 5/006* (2013.01); *F15B 15/065* (2013.01);
(Continued)

(58) Field of Classification Search
None
See application file for complete search history.

(56) References Cited

U.S. PATENT DOCUMENTS

| 6,371,162 B1 | 4/2002 | Groeneveld |
| 6,871,663 B2 | 3/2005 | Groeneveld |

(Continued)

FOREIGN PATENT DOCUMENTS

| CN | 101649848 | 2/2010 |
| CN | 101763121 | 6/2010 |

(Continued)

OTHER PUBLICATIONS

Emerson Process Management, "FieldQ "fully integrated" actuator and control modules", Product Data Sheet, Jul. 2012, 3 pages.

(Continued)

*Primary Examiner* — Roy Y Yi
*Assistant Examiner* — Geoffrey T Evans
(74) *Attorney, Agent, or Firm* — Hanley, Flight & Zimmerman, LLC

(57) ABSTRACT

Methods and apparatus are disclosed for automatically detecting the failure configuration of a pneumatic actuator. A control module is operatively coupled to the actuator, and the actuator is operatively coupled to a valve having a flow control member. When a number of pilot valves included in the control module is indicative of a double-acting actuator, the failure configuration of the actuator is determined based on the number of pilot valves. When the number of pilot valves included in the control module is indicative of a single-acting actuator, the failure configuration of the actuator is determined by comparing a first measurement value obtained in response to moving the flow control member in a first direction to a first position and a second measurement value obtained in response to moving the flow control (Continued)

member in a second direction opposite the first direction to a second position.

21 Claims, 12 Drawing Sheets

(51) Int. Cl.
| | |
|---|---|
| *F16K 37/00* | (2006.01) |
| *F15B 15/28* | (2006.01) |
| *F16K 31/163* | (2006.01) |
| *F15B 5/00* | (2006.01) |
| *F15B 19/00* | (2006.01) |
| *F15B 20/00* | (2006.01) |
| *F16K 31/08* | (2006.01) |

(52) U.S. Cl.
CPC ........ *F15B 15/2861* (2013.01); *F15B 19/005* (2013.01); *F16K 31/1635* (2013.01); *F16K 37/0025* (2013.01); *F16K 37/0041* (2013.01); *F15B 20/002* (2013.01); *F15B 2211/6336* (2013.01); *F15B 2211/862* (2013.01); *F15B 2211/863* (2013.01); *F15B 2211/87* (2013.01); *F15B 2211/8855* (2013.01); *F16K 31/084* (2013.01)

(56) References Cited

U.S. PATENT DOCUMENTS

| | | |
|---|---|---|
| 6,925,958 B2 | 8/2005 | Groeneveld |
| 2003/0172754 A1 | 9/2003 | Groeneveld |
| 2004/0089341 A1 | 5/2004 | Groeneveld |
| 2012/0211681 A1* | 8/2012 | Wang ................. F16K 31/1635 251/30.01 |
| 2015/0107675 A1 | 4/2015 | Kucera |
| 2015/0323936 A1* | 11/2015 | Junk ................... F16K 37/0075 700/282 |
| 2016/0169410 A1* | 6/2016 | Wheeler ............. F16K 37/0041 137/1 |
| 2016/0179599 A1* | 6/2016 | Deshpande ........... H04L 65/601 714/807 |

FOREIGN PATENT DOCUMENTS

| | | |
|---|---|---|
| CN | 101858457 | 10/2010 |
| CN | 103899830 | 7/2014 |
| CN | 105135041 | 12/2015 |

OTHER PUBLICATIONS

Emerson Process Management, "FieldQ "fully integrated" actuator and control modules", Product Data Sheet, Dec. 2015, 75 pages.
Emerson Process Management, "FieldQ Valve Actuator", Installation Operation & Maintenance Manual, May 2010, 40 pages.
Emerson Process Management, "FieldQ Pneumatic actuators and controls", Brochure, 1 page.
International Searching Authority, "International Search Report and Written Opinion," issued in connection with International Patent Application No. PCT/CN2016/075482, dated Dec. 12, 2016, 12 pages.
International Bureau, "International Preliminary Report on Patentability," issued in connection with International Patent Application No. PCT/CN2016/075482, dated Sep. 13, 2018, 5 pages.

* cited by examiner

METHODS AND APPARATUS FOR AUTOMATICALLY DETECTING THE FAILURE CONFIGURATION OF A PNEUMATIC ACTUATOR

FIELD OF THE DISCLOSURE

This present disclosure relates generally to pneumatic actuators and, more particularly, to methods and apparatus for automatically detecting the failure configuration of a pneumatic actuator.

BACKGROUND

Conventional pneumatic actuators include single-acting actuators and double-acting actuators. A pneumatic module and/or a control module may be operatively coupled to the actuator to assist the actuator in operating and/or controlling a valve to which the actuator is operatively coupled. The pneumatic module and/or the control module may be mechanically coupled to and/or integrated with the actuator.

A single-acting actuator includes a drive shaft that moves in a first direction when a pressurized control fluid is supplied to a port of the actuator. A return spring included in the single-acting actuator causes the drive shaft to move in a second direction opposite the first direction when supply of the pressurized control fluid to the port of the actuator fails and/or ceases. The supply of the pressurized control fluid to the port of the actuator may fail and/or cease, for example, as a result of a pneumatic failure and/or an electrical power failure experienced by the actuator, the pneumatic module and/or the control module. The single-acting actuator may have a fail to close failure configuration or a fail to open failure configuration. In the case of a fail to close failure configuration, the return spring causes the drive shaft of the actuator to move in a direction that results in the valve to which the actuator is operatively coupled assuming a closed position. Conversely, in the case of a fail to open failure configuration, the return spring causes the drive shaft of the actuator to move in a direction that results in the valve to which the actuator is operatively coupled assuming an open position.

In contrast to a single-acting actuator, a double-acting actuator includes a drive shaft that moves in a first direction when a pressurized control fluid is supplied to a first port of the actuator and in a second direction when the pressurized control fluid is instead supplied to a second port of the actuator. The drive shaft of the double-acting actuator maintains its current position when supply of the pressurized control fluid to both of the first and second ports of the actuator fails and/or ceases. Accordingly, the double-acting actuator has a fail in last position failure configuration.

SUMMARY

Example methods and apparatus for automatically detecting the failure configuration of a pneumatic actuator are described. An example method includes determining a number of pilot valves of a control module. The control module is operatively coupled to an actuator, and the actuator is operatively coupled to a valve having a flow control member. When the number of pilot valves is indicative of a double-acting actuator, the example method includes determining a failure configuration of the actuator based on the number of pilot valves. When the number of pilot valves is indicative of a single-acting actuator, the example method includes determining the failure configuration of the actuator by: determining a first measurement value in response to moving the flow control member in a first direction to a first position; determining a second measurement value in response to moving the flow control member in a second direction opposite the first direction to a second position; and comparing the first and second measurement values.

An example apparatus includes memory including computer readable instructions, and a processor to execute the computer readable instructions. When executed, the instructions cause the processor to determine a number of pilot valves of a control module. The control module is operatively coupled to an actuator, and the actuator is operatively coupled to a valve having a flow control member. When the number of pilot valves is indicative of a double-acting actuator, the instructions cause the processor to determine a failure configuration of the actuator based on the number of pilot valves. When the number of pilot valves is indicative of a single-acting actuator, the instructions cause the processor to determine the failure configuration of the actuator by: determining a first measurement value in response to moving the flow control member in a first direction to a first position; determining a second measurement value in response to moving the flow control member in a second direction opposite the first direction to a second position; and comparing the first and second measurement values.

An example tangible machine-readable storage medium includes instructions that, when executed, cause a machine to determine a number of pilot valves of a control module. The control module is operatively coupled to an actuator, and the actuator is operatively coupled to a valve having a flow control member. When the number of pilot valves is indicative of a double-acting actuator, the instructions cause the machine to determine a failure configuration of the actuator based on the number of pilot valves. When the number of pilot valves is indicative of a single-acting actuator, the instructions cause the machine to determine the failure configuration of the actuator by: determining a first measurement value in response to moving the flow control member in a first direction to a first position; determining a second measurement value in response to moving the flow control member in a second direction opposite the first direction to a second position; and comparing the first and second measurement values.

BRIEF DESCRIPTION OF THE DRAWINGS

The figures are not to scale. Wherever possible, the same reference numbers will be used throughout the drawing(s) and accompanying written description to refer to the same or like parts.

DETAILED DESCRIPTION

Figure 1:
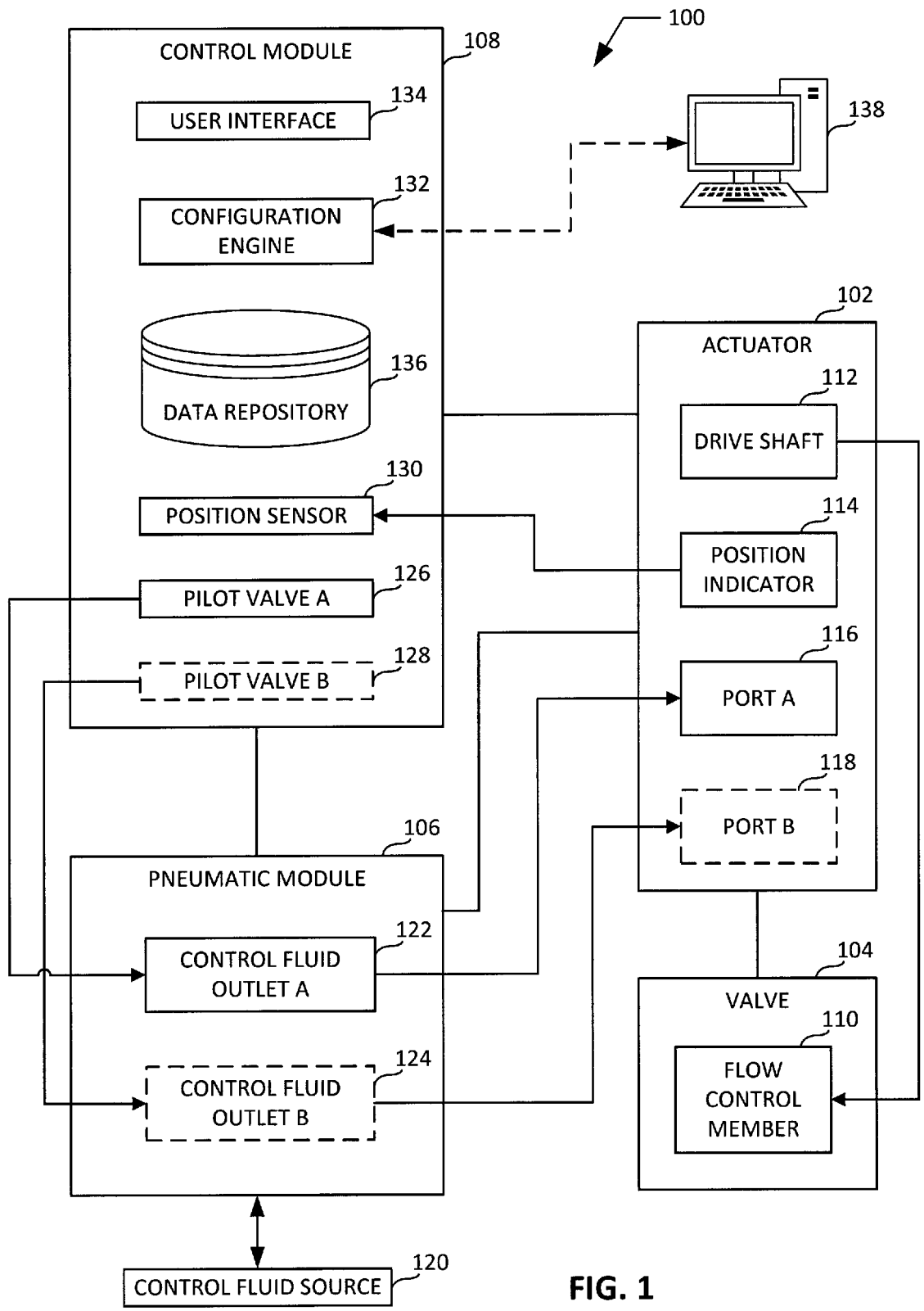
FIG. 1 is a block diagram of an example failure configuration detection apparatus for automatically detecting the failure configuration of an example actuator.

A supply of pressurized control fluid to one or more port(s) of a pneumatic actuator may fail and/or cease as a result of a pneumatic failure and/or an electrical power failure experienced by one or more of the actuator, a pneumatic module operatively coupled to the actuator and/or a control module operatively coupled to the actuator. As used herein in connection with a device (e.g., an actuator, a control module, etc.), the term "failure configuration" refers to the position and/or configuration that a valve being directly and/or indirectly controlled and/or operated by the device assumes in response to the device experiencing a failure such as, for example, a pneumatic failure and/or an electrical power failure. For example, an actuator having a fail to close failure configuration is configured to cause a valve being controlled and/or operated by the actuator to assume a closed position and/or configuration in response to the actuator experiencing a pneumatic failure. As another example, a control module having a fail to close failure configuration is configured to cause a valve being controlled and/or operated by the control module to assume a closed position and/or configuration in response to the control module experiencing an electrical power failure. Thus, the term "failure configuration" as used herein may refer to a pneumatic failure configuration and/or an electrical power failure configuration associated with a device.

Safety and operational concerns arise when the failure configuration of an actuator that has been operatively coupled to a valve does not match the intended function of the valve, or does not match the failure configuration of a control module that is operatively coupled to the actuator. For example, a mismatch between the failure configuration of a control module and the failure configuration of an actuator to which the control module is operatively coupled may prevent a valve to which the actuator is operatively coupled from assuming its intended position (e.g., an open or closed position of the valve) in the event of a failure. Such a mismatch may lead to and/or result in the generation of adverse pressures and/or flow conditions in a system incorporating the valve, and such adverse pressures and/or flow conditions may increase the risk of safety and/or operational hazards including, for example, explosion, implosion, overflow and/or mechanical or electrical failure of the system.

While a human may determine the failure configuration of an actuator and/or of a control module coupled to the actuator, such human involvement in the determination process is time-consuming, prone to error, and, in some instances, invasive. Thus, it is desirable to automatically determine the failure configuration of an actuator that has been operatively coupled to a valve. It is further desirable to automatically determine whether the failure configuration of an actuator matches the failure configuration of a control module that is operatively coupled to the actuator.

Example methods and apparatus disclosed herein automatically detect the failure configuration of an actuator. In some disclosed examples, a number of pilot valves of a control module is determined. In some disclosed examples, the control module is operatively coupled to an actuator, and the actuator is operatively coupled to a valve having a flow control member.

In some disclosed examples, when the number of pilot valves is indicative of a double-acting actuator, a failure configuration of the actuator is determined based on the number of pilot valves. In some disclosed examples, the failure configuration is a fail in last position configuration when the number of pilot valves is indicative of a double-acting actuator.

In some disclosed examples, when the number of pilot valves is indicative of a single-acting actuator, the failure configuration of the actuator is determined by: determining a first measurement value in response to moving the flow control member in a first direction to a first position; determining a second measurement value in response to moving the flow control member in a second direction opposite the first direction to a second position; and comparing the first and second measurement values. In some disclosed examples, the determining of the first measurement value includes activating a first pilot valve of the control module, and the determining of the second measurement value includes deactivating the first pilot valve of the control module. In some disclosed examples, the failure configuration is one of either a fail to close configuration or a fail to open configuration when the number of pilot valves is indicative of a single-acting actuator.

In some disclosed examples, a failure configuration of the control module is determined. In some disclosed examples, the failure configuration of the control module is compared to the failure configuration of the actuator to determine the existence of a failure configuration mismatch between the control module and the actuator.

In some disclosed examples, a movement range associated with moving the valve from the first position to the second position is determined. In some disclosed examples, the movement range is based on a comparison of the first and second measurement values. In some disclosed examples, the movement range is compared to a movement range threshold. In some disclosed examples, an error notification is generated in response to determining that the movement range fails to satisfy the movement range threshold.

In some disclosed examples, a third measurement value is determined in response to moving the flow control member in the first direction to the first position. In some disclosed examples, the first and third measurement values are based on separate instances of moving the flow control member to the first position. In some disclosed examples, a standard deviation associated with the first and third measurement values is determined. In some disclosed examples, the standard deviation is compared to a repeatability threshold. In some disclosed examples, an error notification is generated in response to determining that the standard deviation fails to satisfy the repeatability threshold.

FIG. 1 is a block diagram of an example failure configuration detection apparatus 100 for automatically detecting the failure configuration of an example actuator 102. The example failure configuration detection apparatus 100 includes the actuator 102, an example valve 104, an example pneumatic module 106 and an example control module 108. The actuator 102 is operatively coupled to the valve 104. In the illustrated example of FIG. 1, the actuator 102 is a pneumatic actuator. The pneumatic module 106 and the control module 108 are operatively coupled to one another and to the actuator 102. In some examples, the pneumatic module 106 and the control module 108 may be mechanically coupled to one another and/or to the actuator 102 such that the actuator 102, the pneumatic module 106 and the control module 108 form an integrated actuator structure that may further be mechanically coupled to the valve 104. An example of such an integrated actuator is described in greater detail below in connection with FIG. 2.

In the illustrated example of FIG. 1, the valve 104 includes a flow control member 110, a valve body (not shown), a valve seat (not shown) positioned within the valve body, and a valve stem or shaft (not shown). In some examples, the valve 104 is a rotary valve and the flow control member 110 is a valve disc. In other examples, the valve 104 is a sliding stem valve and the flow control member 110 is a valve plug. The flow control member 110 is operatively coupled to the valve stem or shaft. Upon the application of a force to the valve stem or shaft, the flow control member 110 is displaced relative to the valve seat between a closed position (e.g., a seated position) of the valve 104 and an open position (e.g., an unseated position) of the valve 104. For example, when the valve 104 is a rotary valve, the application of a torque and/or a rotational force to the valve shaft causes the flow control member 110 to rotate relative to the valve seat between a closed position (e.g., parallel relative to the valve seat) of the valve 104 and an open position (e.g., perpendicular relative to the valve seat) of the valve 104.

In the illustrated example of FIG. 1, which employs a rotary valve 104, the actuator 102 includes a drive shaft 112 and a position indicator 114. The drive shaft 112 of the actuator 102 is operatively coupled to the valve shaft and/or the flow control member 110 of the valve 104. Accordingly, the application of a force to the drive shaft 112 causes the flow control member 110 to be displaced relative to the valve seat of the valve 104, as described above. For example, when the valve 104 is a rotary valve, the application of a torque and/or a rotational force to the drive shaft 112 of the actuator 102 causes the flow control member 110 to rotate relative to the valve seat between a closed position (e.g., parallel relative to the valve seat) of the valve 104 and an open position (e.g., perpendicular relative to the valve seat) of the valve 104.

The position indicator 114 is operatively coupled to the drive shaft 112 of the actuator 102 such that a movement of the drive shaft 112 results in a corresponding movement of the position indicator 114. The operative coupling of the drive shaft 112 of the actuator 102 to the valve shaft and/or the flow control member 110 of the valve 104, as described above, results in a correlation between the position of the drive shaft 112 and the position of the flow control member 110. Accordingly, a position of the flow control member 110 may be determined based on the position of the drive shaft 112 indicated by the position indicator 114. For example, when the valve 104 is a rotary valve, the relative position of the position indicator 114 may indicate a relative and/or specific angular and/or rotational position of the drive shaft 112, and may further indicate a relative and/or specific angular and/or rotational position of the flow control member 110 of the valve 104. In such an example, the position indicator 114 may provide a first positional indication when the drive shaft 112 of the actuator 102 is in a first position corresponding to the flow control member 110 and/or the valve 104 being open, and may further provide a second positional indication when the drive shaft 112 of the actuator 102 is in a second position corresponding to the flow control member 110 and/or the valve 104 being closed. An example positional feedback assembly including the position indicator 114 is described in greater detail below in connection with FIGS. 4 and 5.

In the illustrated example of FIG. 1, the actuator 102 may be a single-acting actuator or a double-acting actuator. When the actuator 102 is a single-acting actuator, the actuator 102 includes an example first port 116 and a return spring (not shown). The first port 116 receives a pressurized control fluid such as, for example, pressurized air that causes the drive shaft 112 to displace in a first direction. In the absence of the pressurized control fluid being supplied to the first port 116, the return spring causes the drift shaft 112 to displace in a second direction opposite the first direction. For example, when the valve 104 is a rotary valve and the actuator 102 is a single-acting actuator, pressurized air supplied to the first port 116 of the actuator 102 may cause the drive shaft 112 to rotate in a counter-clockwise direction, while the return spring may cause the drive shaft 112 to rotate in a clockwise direction in the absence of the pressurized air being supplied to the first port 116. Alternatively, pressurized air supplied to the first port 116 of the actuator 102 may cause the drive shaft 112 to rotate in a clockwise direction, while the return spring may cause the drive shaft 112 to rotate in a counter-clockwise direction in the absence of the pressurized air being supplied to the first port 116.

When the actuator 102 is a single-acting actuator, the actuator 102 may be configured to have a fail to close failure configuration or, alternatively, a fail to open failure configuration. If the actuator 102 is configured to have a fail to close failure configuration and the supply of the pressurized control fluid to the first port 116 of the actuator 102 fails and/or ceases, the return spring of the actuator 102 causes the drive shaft 112 to displace in a direction that corresponds to the flow control member 110 and/or, more generally, the valve 104 being in a closed position. An example single-acting actuator having a fail to close failure configuration is described in greater detail below in connection with FIG. 6. If the actuator 102 is configured to have a fail to open failure configuration and the supply of the pressurized control fluid to the first port 116 of the actuator 102 fails and/or ceases, the return spring of the actuator 102 causes the drive shaft 112 to displace in a direction that corresponds to the flow control member 110 and/or, more generally, the valve 104 being in an open position. An example single-acting actuator having a fail to open failure configuration is described in greater detail below in connection with FIG. 7.

When the actuator 102 is a double-acting actuator, the actuator 102 includes the first port 116 and an example second port 118 for respectively receiving a pressurized control fluid such as, for example, pressurized air that causes the drive shaft 112 to displace in a corresponding direction. For example, when the valve 104 is a rotary valve and the actuator 102 is a double-acting actuator, pressurized air supplied to the first port 116 of the actuator 102 may cause the drive shaft 112 to rotate in a counter-clockwise direction, while pressurized air supplied to the second port 118 of the actuator 102 may cause the drive shaft 112 to rotate in a clockwise direction. Alternatively, pressurized air supplied to the first port 116 of the actuator 102 may cause the drive shaft 112 to rotate in a clockwise direction, while pressurized air supplied to the second port 118 of the actuator 102 may cause the drive shaft 112 to rotate in a counter-clockwise direction.

When the actuator 102 is a double-acting actuator, the actuator 102 has a fail in last position failure configuration. In a fail in last position failure configuration, the drive shaft 112 of the actuator 102 maintains and/or remains in its current and/or last position when supply of the pressurized control fluid to the first and second ports 116, 118 of the actuator 102 fails and/or ceases. A first example double-acting actuator having a fail in last position failure configuration is described in greater detail below in connection with FIG. 8. A second example double-acting actuator having a fail in last position failure configuration is described in greater detail below in connection with FIG. 9.

In the illustrated example of FIG. 1, the pneumatic module 106 supplies pressurized control fluid to the actuator 102. The pneumatic module 106 receives a pressurized control fluid such as, for example, pressurized air from an example pressurized control fluid source 120. The pneumatic module 106 includes a number of control fluid outlets fluidly coupled to the corresponding number of ports included in the actuator 102 to which the pneumatic module 106 is operatively coupled. For example, when the actuator 102 is a single-acting actuator, the pneumatic module 106 includes an example first control fluid outlet 122 that supplies the pressurized control fluid to the first port 116 of the actuator 102. In such an example, when the pneumatic module 106 fails and/or ceases to supply the pressurized control fluid via the first control fluid outlet 122, the return spring and/or the drive shaft 112 of the actuator 102 will cause the flow control member 110 of the valve 104 to assume a position corresponding to the failure configuration (e.g., either a fail to close configuration or a fail to open configuration) associated with the actuator 102. As another example, when the actuator 102 is a double-acting actuator, the pneumatic module 106 includes the first control fluid outlet 122 and an example second control fluid outlet 124 that respectively supply the pressurized control fluid to the corresponding first and second ports 116, 118 of the actuator 102. In such an example, when the pneumatic module 106 fails and/or ceases to supply the pressurized control fluid via both of the first and second control fluid outlets 122, 124, the drive shaft 112 of the actuator 102 and/or the flow control member 110 of the valve 104 maintains and/or remains in its current and/or last position, consistent with the fail in last position failure configuration associated with the actuator 102.

In the illustrated example of FIG. 1, the control module 108 controls the operation of the pneumatic module 106, the actuator 102 and/or the valve 104. The control module 108 includes a number of example pilot valves 126, 128, an example position sensor 130, an example configuration engine 132, an example user interface 134, and an example data repository 136.

The number of pilot valves of the control module 108 is equal to the corresponding number of control fluid outlets included in the pneumatic module 106 to which the control module 108 and/or the actuator 102 is coupled. Respective ones of the pilot valves are operatively coupled to corresponding respective ones of the control fluid outlets. For example, when the actuator 102 is a single-acting actuator, the control module 108 includes an example first pilot valve 126 that transduces, transforms and/or converts an electrical control signal and/or instruction into a pneumatic control signal and/or instruction to control the operation of the first control fluid outlet 122 of the pneumatic module 106. In such an example, when the electrical control signal indicates that the first control fluid outlet 122 should not supply the pressurized control fluid to the first port 116 of the actuator 102 (e.g., that the first pilot valve 126 should be "OFF"), the first pilot valve 126 generates and/or provides a corresponding pneumatic control signal that causes the first control fluid outlet 122 of the pneumatic module 106 to cease supplying the pressurized control fluid to the first port 116 of the actuator 102. Conversely, when the electrical control signal indicates that the first control fluid outlet 122 should supply the pressurized control fluid to the first port 116 of the actuator 102 (e.g., that the first pilot valve 126 should be "ON"), the first pilot valve 126 generates and/or provides a corresponding pneumatic control signal that causes the first control fluid outlet 122 of the pneumatic module 106 to supply the pressurized control fluid to the first port 116 of the actuator 102.

As another example, when the actuator 102 is a double-acting actuator, the control module 108 includes the first pilot valve 126 and an example second pilot valve 128, where the first and second pilot valves 126, 128 respectively transduce, transform and/or convert one or more electrical control signal(s) and/or instruction(s) into corresponding pneumatic control signal(s) and/or instruction(s) to control the operation of the corresponding first and second control fluid outlets 122, 124 of the pneumatic module 106. In such an example, when the electrical control signal(s) indicate that neither of the first and second control fluid outlets 122, 124 should supply the pressurized control fluid to the corresponding first and second ports 116, 118 of the actuator 102 (e.g., that the first and second pilot valves 126, 128 should both be "OFF"), the first and second pilot valves 126, 128 generate and/or provide corresponding pneumatic control signal(s) that cause the first and second control fluid outlets 122, 124 of the pneumatic module 106 to cease supplying the pressurized control fluid to the first and second ports 116, 118 of the actuator 102. Conversely, when the electrical control signal(s) indicate that one or both of the first and/or second control fluid outlets 122, 124 should supply the pressurized control fluid to the corresponding first and/or second ports 116, 118 of the actuator 102 (e.g., that one or both of the first and/or second pilot valves 126, 128 should be "ON"), the first and/or second pilot valves 126, 128 generate and/or provide corresponding pneumatic control signal(s) that cause the first and/or second control fluid outlets 122, 124 of the pneumatic module 106 to supply the pressurized control fluid to the first and/or second ports 116, 118 of the actuator 102.

In the illustrated example of FIG. 1, the position sensor 130 of the control module 108 is operatively coupled to the position indicator 114 of the actuator 102. As described above, the position indicator 114 of the actuator 102 may provide a first positional indication when the drive shaft 112 of the actuator 102 is in a first position corresponding to the flow control member 110 and/or the valve 104 being open, and may further provide a second positional indication when the drive shaft 112 of the actuator 102 is in a second position corresponding to the flow control member 110 and/or the valve 104 being closed. The position sensor 130 senses and/or measures data corresponding to the respective positions of the drive shaft 112 of the actuator 102 and/or the respective positions of the flow control member 110 of the valve 104 based on the corresponding respective indications provided by the position indicator 114.

In some examples, the structural design of the drive shaft 112, the position indicator 114 and/or the position sensor 130 results in the position sensor 130 sensing and/or measuring a measurement value corresponding to the first positional indication that is greater than a measurement value corresponding to the second positional indication. For example, the structural arrangement and/or configuration of the drive shaft 112, the position indicator 114 and/or the position sensor 130 may dictate that a measurement value sensed and/or measured by the position sensor 130 when the flow control member 110 is in the open position will always be relatively greater than a measurement value sensed and/or measured by the position sensor 130 when the flow control member 110 is in the closed position.

In other examples, the structural design of the drive shaft 112, the position indicator 114 and/or the position sensor 130 results in the position sensor 130 sensing and/or measuring a measurement value corresponding to the first positional indication that is less than a measurement value corresponding to the second positional indication. For example, the structural arrangement and/or configuration of the drive shaft 112, the position indicator 114 and/or the position sensor 130 may dictate that a measurement value sensed and/or measured by the position sensor 130 when the flow control member 110 is in the open position will always be relatively less than a measurement value sensed and/or measured by the position sensor 130 when the flow control member 110 is in the closed position. An example positional feedback assembly including the position sensor 130 is described in greater detail below in connection with FIGS. 4 and 5.

In the illustrated example of FIG. 1, the configuration engine 132 of the control module 108 controls the respective pneumatic status (e.g., the "ON" or "OFF" status) of the first and second pilot valves 126, 128 of the control module 108. For example, the configuration engine 132 may generate one or more electrical control signal(s) to be transmitted to respective ones of the first and/or second pilot valves 126, 128, as described above. In some examples, the electrical control signal(s) generated by the configuration engine 132 may be based on one or more signal(s) and/or instruction(s) corresponding to a user input. In some examples, the signal(s) and/or instruction(s) corresponding to the user input are transmitted to the configuration engine 132 and/or, more generally, to the control module 108 via the example user interface 134. In other examples, the signal(s) and/or instruction(s) corresponding to the user input may additionally and/or alternatively be transmitted to the configuration engine 132 and/or, more generally, to the control module 108 from an example communication terminal 138 (e.g., a personal computer, laptop computer, etc.) that is operatively connected to the control module 108 via a bus and/or a network. In such other examples, the communication terminal 138 may include its own user interface for receiving the signal(s) and/or instruction(s) corresponding to the user input.

The user interface 134 includes one or more input device(s) via which the user interface 134 receives information and/or data from the end user of the failure configuration detection apparatus 100 of FIG. 1. For example, the user interface 134 may include one or more buttons, one or more switches, a keyboard, a mouse, a microphone and/or a liquid crystal display having a touchscreen that enable(s) the end user to convey data and/or commands to the configuration engine 132 and/or, more generally, the control module 108 of the failure configuration detection apparatus 100.

In some examples, the user input provided to the configuration engine 132 via the user interface may cause the configuration engine 132 to initiate and/or perform an automated process and/or method to detect the failure configuration of the actuator 102 to which the control module 108 is coupled. Examples of such an automated process and/or method are described in greater detail below in connection with FIGS. 10, 11A, 11B, 12A and 12B.

The user interface 134 also includes one or more output device(s) via which the user interface 134 presents information and/or data in textual, graphical, visual and/or audible form to the end user of the failure configuration detection apparatus 100. For example, the user interface 134 may include one or more light emitting diode(s) for presenting visual information, one or more speaker(s) for presenting audible information, and/or a display device (e.g., a liquid crystal display, a cathode ray tube display, etc.) for presenting textual and/or graphical information. In some examples, one or more of the output device(s) of the user interface 134 may provide a notification and/or message to the end user of the failure configuration detection apparatus 100. In some examples, the notification and/or message may correspond to the determination and/or identification of a failure configuration associated with the actuator 102 to which the control module 108 is coupled. In some examples, the notification and/or message may correspond to the determination and/or identification of a mismatch between a failure configuration associated with the control module 108 and a failure configuration associated with the actuator 102 to which the control module 108 is coupled. In some examples, the notification and/or message may correspond to an operational error associated with the actuator 102 to which the control module 108 is coupled. In some examples, the operational error may correspond to one or more of a movement failure error, a movement range error and/or a repeatability error associated with the actuator 102.

In addition to controlling the respective pneumatic status (e.g., the "ON" or "OFF" status) of the first and second pilot valves 126, 128 of the control module 108, the configuration engine 132 of FIG. 1 also controls and/or executes an automated process and/or method to detect the failure configuration of the actuator 102 to which the control module 108 is coupled. In some examples, the user input provided to the configuration engine 132 via the user interface 134 causes the configuration engine 134 to initiate and/or perform such an automated process and/or method. In connection with such an automated process and/or method, the configuration engine 132 determines and/or identifies the number of pilot valves included in the control module 108. As described above, the existence of only a single pilot valve (e.g., the first pilot valve 126) is indicative of a single-acting actuator, while the existence of two pilot valves (e.g., the first and second pilot valves 128, 128) is indicative of a double-acting actuator.

Based on the number of determined and/or identified pilot valves, the configuration engine 132 causes one or more of the example pilot valve(s) 126, 128 to achieve and/or adopt one or more specified pneumatic conditions (e.g., an "ON" status or an "OFF" status), and further causes the collection of measurement data from the position sensor 130 at and/or during one or more specified time(s) and/or instance(s)

associated with the specified pneumatic condition(s). For example, when the number of pilot valves is indicative of a single-acting actuator, the configuration engine 132 may cause a first measurement value to be collected from the position sensor 130 when the first pilot valve 126 has been activated (e.g., when the first pilot valve 126 is "ON") for a specified duration, and may further cause a second measurement value to be collected from the position sensor 130 when the first pilot valve 126 has been deactivated (e.g., when the first pilot valve 126 is "OFF") for a specified duration.

The configuration engine 132 determines the failure configuration of the single-acting actuator based in part on correlation data that is known by and/or accessible to the configuration engine 132. The correlation data identifies and/or indicates one or more relationships between the structural arrangement of the drive shaft 112, the position indicator 114 and/or the position sensor 130, and the result that moving the drive shaft 112 in a specific direction produces on the flow control member 110 of the valve 104 to which the actuator 102 is coupled. For example, when the valve 104 is a rotary valve, example correlation data may indicate that clockwise rotation of the drive shaft 112 of the actuator 102 will always result in the flow control member 110 of the valve 104 moving toward a closed position, while counter-clockwise rotation of the drive shaft 112 of the actuator 102 will always result in the flow control member 110 of the valve 104 moving toward an open position. Such example correlation data may further indicate that the drive shaft 112, the position indicator 114 and the position sensor 130 are configured such that a measurement value sensed and/or measured by the position sensor 130 when the flow control member 110 is in an open position will always be relatively greater than a measurement value sensed and/or measured by the position sensor 130 when the flow control member 110 is in a closed position. Such example correlation data may be derived from and/or based on the example structural arrangement and/or configuration of the drive shaft 112, the position indicator 114 and the position sensor 130 illustrated in FIGS. 2-5 and described below.

The configuration engine 132 determines the failure configuration of the single-acting actuator based on the correlation data and a comparison of the first and second measurement values. For example, if the configuration engine 132 determines that the first measurement value (obtained when the first pilot valve 126 is "ON") is greater than the second measurement value (obtained when the first pilot valve 126 is "OFF"), the configuration engine 132 further determines, based on the example correlation data described above, that the single-acting actuator has a fail to close failure configuration. Such a determination is based on the relatively lower measurement value obtained when the first pilot valve 126 is deactivated (e.g., "OFF") which, based on the example correlation data, correlates to a closed position of the flow control member 110. If the configuration engine 132 instead determines that the first measurement value (obtained when the first pilot valve 126 is "ON") is less than the second measurement value (obtained when the first pilot valve 126 is "OFF"), the configuration engine 132 further determines, based on the example correlation data described above, that the single-acting actuator has a fail to open failure configuration. Such a determination is based on the relatively higher measurement value obtained when the first pilot valve 126 is deactivated (e.g., "OFF") which, based on the example correlation data, correlates to an open position of the flow control member.

Continuing with the above example relating to the single-acting actuator, the configuration engine 132 may also compare the first measurement value and the second measurement value to determine the existence of operational errors relating to the single-acting actuator. For example, if the configuration engine 132 determines that the first measurement value is equal to the second measurement value, such a determination may be indicative of a movement error corresponding to a failure of the drive shaft 112 of the actuator 102 to move in response to the first pilot valve 126 being activated and/or deactivated. The configuration engine 132 may generate an error notification and/or message in response to detecting such a movement error.

As another example in relation to the single-acting actuator, the configuration engine 132 may compare the difference between the first and second measurement values to a movement range threshold that identifies and/or corresponds to an expected range of movement (e.g., ninety degrees of rotational movement) of the drive shaft 112 of the actuator 102. In such an example, a departure from the movement range threshold may be indicative of a movement range error corresponding to a failure of the drive shaft 112 of the actuator 102 to move over the expected range of movement. The configuration engine 132 may generate an error notification and/or message in response to detecting that the difference between the first and second measurement values fails to satisfy the movement range threshold.

As another example in relation to the single-acting actuator, the configuration engine 132 may further cause the pneumatic cycling (e.g., "OFF" to "ON" and back to "OFF") of the first pilot valve 126 and associated measurement value collection to be repeated a specified number of time(s) and/or instance(s). The configuration engine 132 may then determine an average value for the collected measurement values corresponding to the first pilot valve 126 being activated (e.g., "ON") as well as an average value for the collected measurement values corresponding to the first pilot valve 126 being deactivated (e.g., "OFF"). The configuration engine 132 may also determine respective standard deviations associated with the aforementioned average values. The configuration engine 132 may then compare the respective standard deviations with a repeatability threshold. In such an example, a departure from the repeatability threshold may be indicative of inconsistent and/or faulty data obtained from the position sensor 130 of the control module 108, and may further be indicative of an operational error relating to the movement of the drive shaft 112 of the actuator 102. The configuration engine 132 may generate an error notification and/or message in response to detecting that a respective one of the standard deviations fails to satisfy the repeatability threshold.

When the number of pilot valves is indicative of a double-acting actuator, the configuration engine 132 determines that the actuator 102 to which the control module 108 is coupled has a fail in last position failure position. Unlike the single-acting actuator example described above, the configuration engine 132 need not obtain measurement values from the position sensor 130 to determine the failure configuration of the double-acting actuator. Nevertheless, prior to and/or subsequent to such a determination, the configuration engine 132 may cause a first measurement value to be collected from the position sensor 130 when only the first pilot valve 126 has been activated (e.g., when the first pilot valve 126 is "ON" and the second pilot valve 128 is "OFF") for a specified duration. The configuration engine 132 may further cause a second measurement value to be collected from the position sensor 130 when both the first and second pilot valves 126, 128 have been deactivated (e.g., when the first pilot valve 126 is "OFF" and the second pilot valve 128 is "OFF") for a specified duration. The configuration engine 132 may further cause a third measurement value to be collected from the position sensor 130 when only the second pilot valve 128 has been activated (e.g., when the first pilot valve 126 is "OFF" and the second pilot valve 128 is "ON") for a specified duration.

Continuing with the above example relating to the double-acting actuator, the configuration engine 132 may compare the first measurement value and the third measurement value to determine the existence of operational errors relating to the double-acting actuator. For example, if the configuration engine 132 determines that the first measurement value is equal to the third measurement value, such a determination may be indicative of a movement error corresponding to a failure of the drive shaft 112 of the actuator 102 to move in response to the first pilot valve 126 and/or the second pilot valve 128 being activated. The configuration engine 132 may generate an error notification and/or message in response to detecting such a movement error.

As another example in relation to the double-acting actuator, the configuration engine 132 may compare the first measurement value to the second measurement value. If the configuration engine 132 determines that the first measurement value is not equal to the second measurement value, such a determination may be indicative of a movement error corresponding to the drive shaft 112 of the actuator 102 moving in response to the first pilot valve 126 and the second pilot valve 128 both being deactivated. The configuration engine 132 may generate an error notification and/or message in response to detecting such a movement error.

As another example in relation to the double-acting actuator, the configuration engine 132 may compare the difference between the first and third measurement values to a movement range threshold that identifies and/or corresponds to an expected range of movement (e.g., ninety degrees of rotational movement) of the drive shaft 112 of the actuator 102. In such an example, a departure from the movement range threshold may be indicative of a movement range error corresponding to a failure of the drive shaft 112 of the actuator 102 to move over the expected range of movement. The configuration engine 132 may generate an error notification and/or message in response to detecting that the difference between the first and third measurement values fails to satisfy the movement range threshold.

As another example in relation to the double-acting actuator, the configuration engine 132 may further cause the pneumatic cycling (e.g., "OFF" to "ON" and back to "OFF") of the first and second pilot valves 126, 128 and associated measurement value collection to be repeated a specified number of time(s) and/or instance(s). The configuration engine 132 may then determine an average value for the collected measurement values corresponding to the first pilot valve 126 being activated (e.g., "ON") as well as an average value for the collected measurement values corresponding to the second pilot valve 128 being activated (e.g., "ON"). The configuration engine 132 may also determine respective standard deviations associated with the aforementioned average values. The configuration engine 132 may then compare the respective standard deviations with a repeatability threshold. In such an example, a departure from the repeatability threshold may be indicative of inconsistent and/or faulty data obtained from the position sensor 130 of the control module 108, and may further be indicative of an operational error relating to the movement of the drive shaft 112 of the actuator 102. The configuration engine 132 may generate an error notification and/or message in response to detecting that a respective one of the standard deviations fails to satisfy the repeatability threshold.

In some examples, in addition to determining the failure configuration of the actuator 102, the configuration engine 132 also determines a failure configuration of the control module 108. The failure configuration of the control module 108 may be accessible to the configuration engine 132 from the data repository 136. The configuration engine 132 compares the failure configuration of the control module 108 to the failure configuration of the actuator 102 to determine the existence of a failure configuration mismatch between the control module 108 and the actuator 102. For example, if the configuration engine 132 determines that the actuator 102 has a fail to close failure configuration and that the control module 108 has a fail to open or a fail in last position failure configuration, the configuration engine 132 determines that a failure configuration mismatch exists between the actuator 102 and the control module 108. The configuration engine 132 may generate an error notification and/or message in response to detecting the existence of a failure configuration mismatch.

In the illustrated example of FIG. 1, the data repository 136 stores data and/or information corresponding to the number of pilot valves associated with the control module 108. The data repository 136 further stores correlation data identifying and/or indicating one or more relationships between the structural arrangement of the drive shaft 112, the position indicator 114 and/or the position sensor 130, and the result that moving the drive shaft 112 in a specific direction produces on the flow control member 110 of the valve 104 to which the actuator 102 is coupled. The data repository 136 further stores data and/or information corresponding to one or more measurement value(s) collected and/or obtained from the position sensor 130 of the control module 108 along with the respective corresponding pneumatic status of the first and/or second pilot valve(s) 126, 128 at and/or during the time at which the measurement value(s) were collected and/or obtained.

The data repository 136 of FIG. 1 further stores data and/or information corresponding to any failure configuration determined and/or identified by the configuration engine 132 with respect to the actuator 102 to which the control module 108 is coupled. The data repository 136 further stores data and/or information corresponding to the failure configuration of the control module 108. The data repository 136 further stores data and/or information corresponding to any mismatch determined and/or identified by the configuration engine 132 between the failure configuration associated with the control module 108 and the failure configuration associated with the actuator 102 to which the control module 108 is coupled.

The data repository 136 of FIG. 1 further stores data and/or information corresponding to a movement range threshold associated with an expected and/or acceptable range of movement of the drive shaft 112 of the actuator 102. The data repository further stores data and/or information corresponding to a repeatability threshold associated with an expected and/or acceptable standard deviation for a plurality of measurement values collected and/or obtained from the position sensor 130 at and/or during separate instances of the first and/or second pilot valve(s) 126, 128 achieving and/or adopting a specific pneumatic status.

The data repository 136 of FIG. 1 may be implemented by any type(s) and/or any number(s) of a storage drive, a storage disk, a flash memory, a read-only memory (ROM), a random-access memory (RAM), a hard disk drive, a compact disk (CD), a digital versatile disk (DVD), a Blu-ray disc, a cache and/or any other storage medium in which information is stored for any duration (e.g., for extended time periods, permanently, brief instances, for temporarily buffering, and/or for caching of the information). The information stored in the data repository 136 may be stored in any file and/or data structure format, organization scheme, and/or arrangement. The information stored in the data repository 136 is accessible to the configuration engine 132, the user interface 134 and/or, more generally, the control module 108 of the failure configuration detection apparatus 100 of FIG. 1.

While an example manner of implementing the example failure configuration detection apparatus 100 is illustrated in FIG. 1, one or more of the elements, processes and/or devices illustrated in FIG. 1 may be combined, divided, re-arranged, omitted, eliminated and/or implemented in any other way. Further, the example first and second pilot valves 126, 128, the example position sensor 130, the example configuration engine 132, the example user interface 134 and/or the example data repository 136 of FIG. 1 may be implemented by hardware, software, firmware and/or any combination of hardware, software and/or firmware. Thus, for example, any of the example first and second pilot valves 126, 128, the example position sensor 130, the example configuration engine 132, the example user interface 134 and/or the example data repository 136 could be implemented by one or more analog or digital circuit(s), logic circuit(s), programmable processor(s), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example first and second pilot valves 126, 128, the example position sensor 130, the example configuration engine 132, the example user interface 134 and/or the example data repository 136 is/are hereby expressly defined to include a tangible computer readable storage device or storage disk such as a memory, a digital versatile disk (DVD), a compact disk (CD), a Blu-ray disk, etc. storing the software and/or firmware. Further still, the example failure configuration detection apparatus 100 of FIG. 1 may include one or more element(s), process(es) and/or device(s) in addition to, or instead of, those illustrated in FIG. 1, and/or may include more than one of any or all of the illustrated elements, processes and devices.

Figure 2:
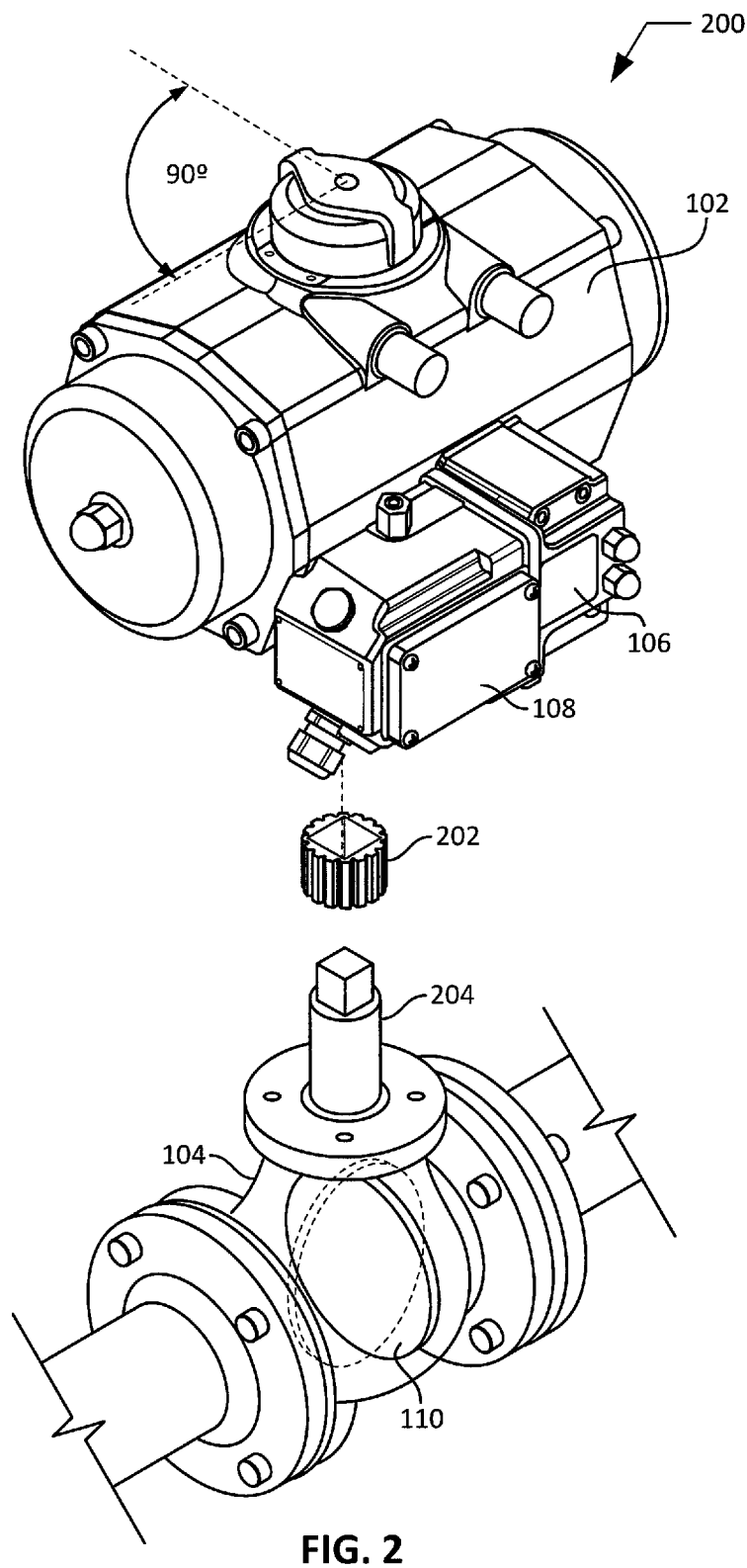
FIG. 2 is a perspective view of the example actuator, the example pneumatic module and the example control module of FIG. 1 configured as an example integrated actuator capable of being mechanically coupled to the example valve of FIG. 1.

FIG. 2 is a perspective view of the example actuator 102, the example pneumatic module 106 and the example control module 108 of FIG. 1 configured as an example integrated actuator 200 capable of being mechanically coupled to the example valve 104 of FIG. 1. In the illustrated example of FIG. 2, the drive shaft 112 (not shown in FIG. 2) of the actuator 102 is operatively coupled via an example drive insert 202 to an example valve shaft 204 of the valve 104. In the illustrated example of FIG. 2, the valve 104 is a rotary valve. The flow control member 110 of the valve 104 is operatively coupled to the valve shaft 204. In the illustrated example of FIG. 2, the flow control member 110 is a valve disc.

In the illustrated example of FIG. 2, the flow control member 110 is capable of being rotated by approximately ninety degrees counter-clockwise from a closed position (as shown in FIG. 2) to an open position (as indicated by phantom lines in FIG. 2). When the flow control member 110 has assumed the open position, a clockwise rotation of the flow control member 110 by approximately ninety degrees returns the flow control member 110 to the closed position. The position of the flow control member 110 and/or the valve shaft 204 is controlled by the position of the drive shaft 112 of the actuator 102. The position of the drive shaft 112 of the actuator 102 is controlled by the supply of pressurized fluid to the actuator 102 by the pneumatic module 106. The supply of pressurized fluid by the pneumatic module 106 is controlled by the control module 108.

Figure 3:
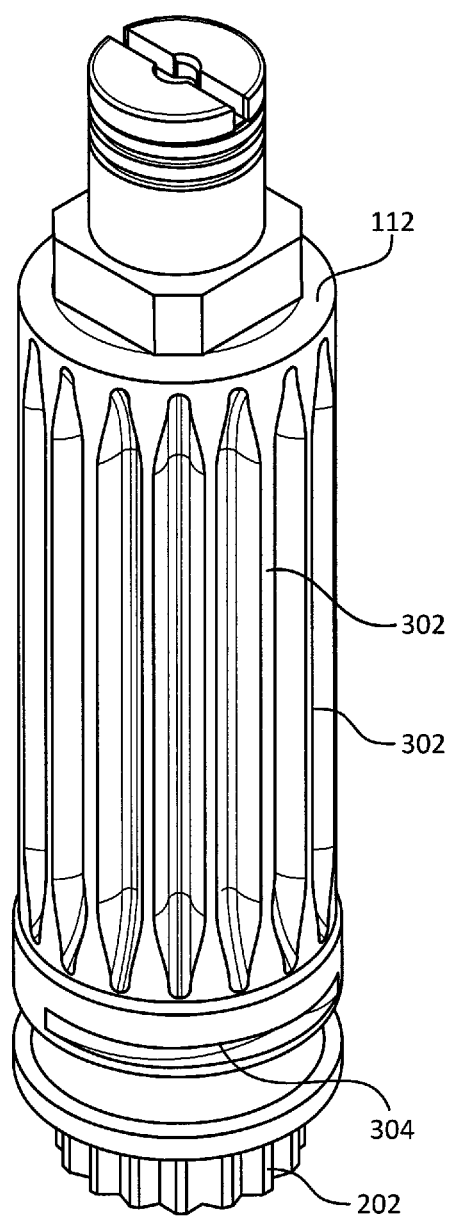
FIG. 3 is a perspective view of the example drive shaft of the example actuator of FIGS. 1-2.

FIG. 3 is a perspective view of the example drive shaft 112 of the example actuator 102 of FIGS. 1 and 2. In the illustrated example of FIG. 3, the drive shaft 112 is coupled to the drive insert 202 shown in FIG. 2. In the illustrated example of FIG. 3, the drive shaft 112 is a cylindrically-shaped pinion having a plurality of example teeth 302 extending longitudinally along a portion of the outer surface of the drive shaft 112. As described in greater detail below in connection with FIGS. 6-9, the teeth 302 of the drive shaft 112 are configured to mate with and/or engage a plurality of racks so as to form a rack and pinion configuration. In the illustrated example of FIG. 3, the drive shaft 112 further includes an example cam surface 304 extending circumferentially around a portion of the outer surface of the drive shaft 112. As described in greater detail below in connection with FIGS. 4-5, the cam surface 304 of the drive shaft 112 is configured to mate with and/or engage a position indicator (e.g., the position indicator 114 of FIG. 1) having a cam follower rod.

Figure 4:
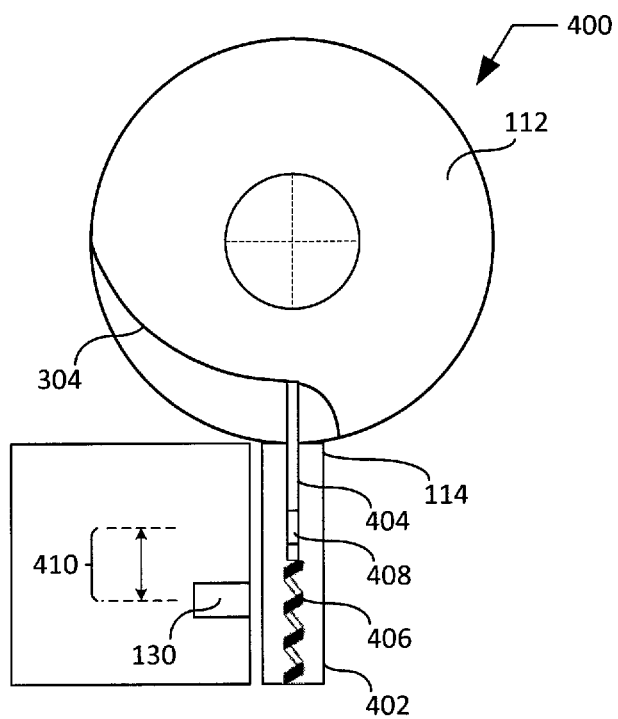
FIG. 4 illustrates an example first position of an example positional feedback assembly operatively coupled to the example drive shaft of FIGS. 1-3.

FIG. 4 illustrates an example first position of an example positional feedback assembly 400 operatively coupled to the example drive shaft 112 of FIGS. 1-3. The positional feedback assembly 400 includes the example position indicator 114 and the example position sensor 130 of FIG. 1. In the illustrated example of FIG. 4, the position indicator 114 includes an example housing 402, an example cam follower rod 404, an example spring 406, and an example magnet 408. The cam follower rod 404 is slidably positioned within the housing 402. The magnet 408 is coupled to and/or embedded within the cam follower rod 404 at a fixed position. A first end of the cam follower rod 404 contacts and/or engages the cam surface 304 of the drive shaft 112. A second end of the cam follower rod 404 contacts and/or engages the spring 406. The spring 406 biases the cam follower rod 404 to maintain contact with the cam surface 304 as the drive shaft 112 rotates clockwise and/or counter-clockwise.

In the illustrated example of FIG. 4, the position sensor 130 is a magnetic resistance sensor that senses and/or measures resistance values based on and/or corresponding to the distance between the position sensor 130 and the magnet 408 of the position indicator 114. In some examples, the resistance value sensed and/or measured by the position sensor 130 increases as the distance between the position sensor 130 and the magnet 408 of the position indicator 114 decreases. For example, the drive shaft 112, as shown in FIG. 4, is in a position corresponding to a closed position of the flow control member 110 of the valve 104 to which the drive shaft 112 is coupled. When the drive shaft 112 is in the position shown in FIG. 4, the magnet 408 of the position indicator 114 is separated from the example position sensor 130 by an example first distance 410.

Figure 5:
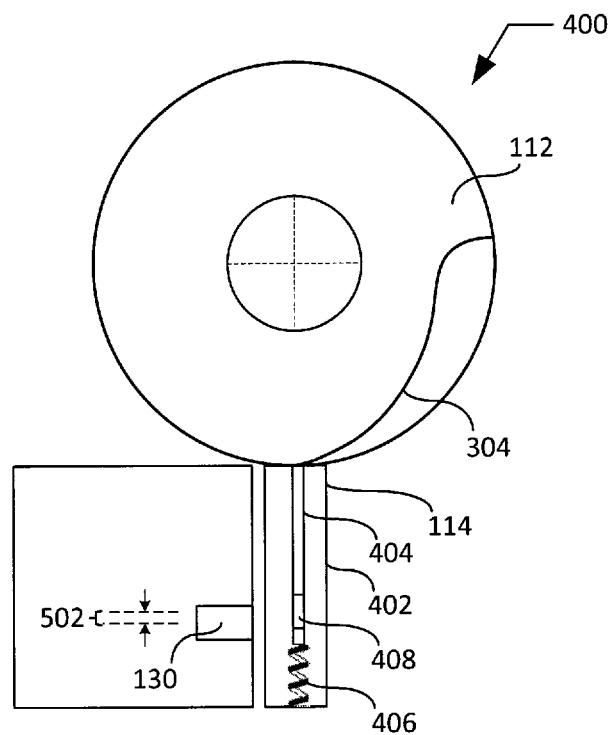
FIG. 5 illustrates an example second position of the example positional feedback assembly of FIG. 4.

FIG. 5 illustrates an example second position of the example positional feedback assembly 400 of FIG. 4. As shown in FIG. 5, the drive shaft 112 is in a position corresponding to an open position of the flow control member 110 of the valve 104 to which the drive shaft 112 is coupled. When the drive shaft 112 is in the position shown in FIG. 5, the magnet 408 of the position indicator 114 is separated from the example position sensor 130 by an example second distance 502 that is less than the example first distance 410. Thus, the resistance value sensed and/or measured by the position sensor 130 when the drive shaft 112 is in a position corresponding to the open position of the flow control member 110 will be greater than the resistance value sensed and/or measured by the position sensor 130 when the drive shaft 112 is in a position corresponding to the closed position of the flow control member 110.

Accordingly, in the illustrated examples of FIGS. 4 and 5, a correlation exists whereby a relatively higher resistance value sensed and/or measured by the position sensor 130 can be associated with an open position of the flow control member 110 of the valve 104, while a relatively lower resistance value sensed and/or measured by the position sensor 130 can be associated with a closed position of the flow control member 110 of the valve 104. In other examples, alternate structural designs of the cam surface 304 of the drive shaft 112, the magnet 408 of the position indicator 114, and/or the position sensor 130 may cause the opposite correlation to exist. For example, reversing the profile of the cam surface 304 of the drive shaft 112 from that shown in FIGS. 4 and 5 may result in a correlation whereby a relatively lower resistance value sensed and/or measured by the position sensor 130 can be associated with an open position of the flow control member 110 of the valve 104, while a relatively higher resistance value sensed and/or measured by the position sensor 130 can be associated with a closed position of the flow control member 110 of the valve 104. As another example, adjusting the location of the position sensor 130 from that shown in FIGS. 4 and 5 (e.g., moving the position sensor 130 closer to the drive shaft 112) may result in the distance between the position sensor 130 and the magnet 408 of the position indicator 114 being less when the flow control member 110 of the valve 104 is in the closed position compared to when the flow control member 110 of the valve 104 is in the open position. In such an example, a correlation may exist whereby a relatively low resistance value sensed and/or measured by the position sensor 130 can be associated with an open position of the flow control member 110 of the valve 104, while a relatively higher resistance value sensed and/or measured by the position sensor 130 can be associated with a closed position of the flow control member 110 of the valve 104.

Figure 6:
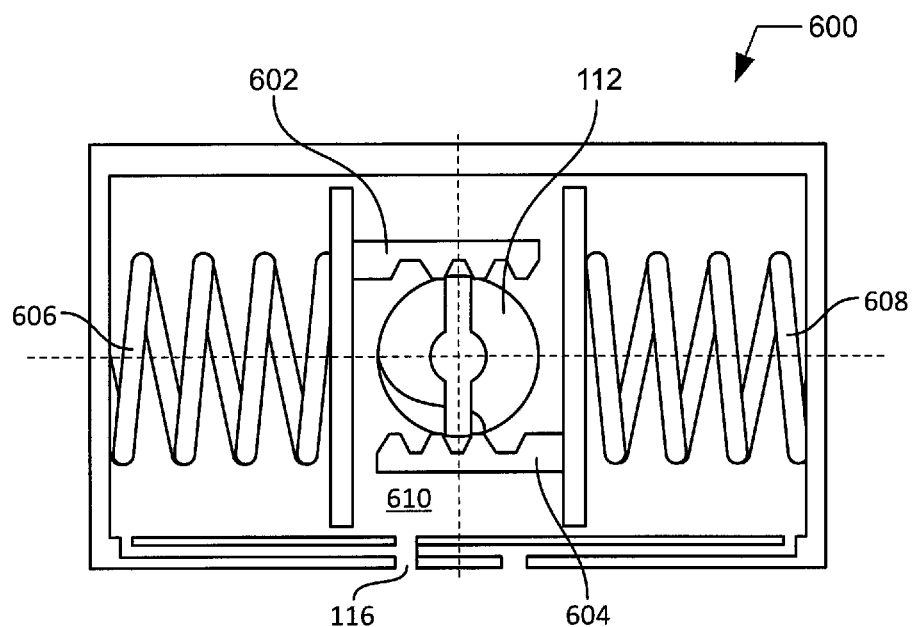
FIG. 6 illustrates the example actuator of FIGS. 1-2 configured as an example single-acting actuator having an example fail to close failure configuration.

FIG. 6 illustrates the example actuator 102 of FIGS. 1-2 configured as an example single-acting actuator 600 having an example fail to close failure configuration. The single-acting actuator 600 of FIG. 6 includes the example drive shaft 112 described above in connection with FIGS. 1-3. In the illustrated example of FIG. 6, the drive shaft 112 mates with and/or engages example first and second racks 602, 604 such that a rack and pinion configuration exists between the drive shaft 112 and the first and second racks 602, 604. The first and second racks 602, 604 are respectively coupled to example first and second return springs 606, 608. In the illustrated example of FIG. 6, forces exerted by the first and second return springs 606, 608 on the first and second racks 602, 604 have caused the first and second racks 602, 604 to converge inwardly toward one another and, accordingly, for the drive shaft 112 to have rotated in a clockwise direction into the position illustrated in FIG. 6. In the illustrated example of FIG. 6, the rotation of the drive shaft 112 in a clockwise direction corresponds to closing a flow control member of a valve (e.g., the flow control member 110 of the valve 104 of FIGS. 1-2) to which the single-acting actuator 600 is operatively coupled. Thus, the closed position of the drive shaft 112 illustrated in FIG. 6 corresponds to the failure position and/or failure configuration of the single-acting actuator 600.

When a pressurized control fluid is supplied to the first port 116 of the single-acting actuator 600 of FIG. 6, a corresponding increase in pressure is introduced to an example first area 610. The increase in pressure within the first area 610 causes the first and second racks 602, 604 to expand outwardly away from one another and, accordingly, for the drive shaft 112 to rotate in a counter-clockwise direction. When the supply of the pressurized control fluid to the first port 116 fails and/or ceases, the return springs 606, 608 cause the drive shaft 112 to rotate in a clockwise direction back to the closed position corresponding to the failure position of the single-acting actuator 600.

Figure 7:
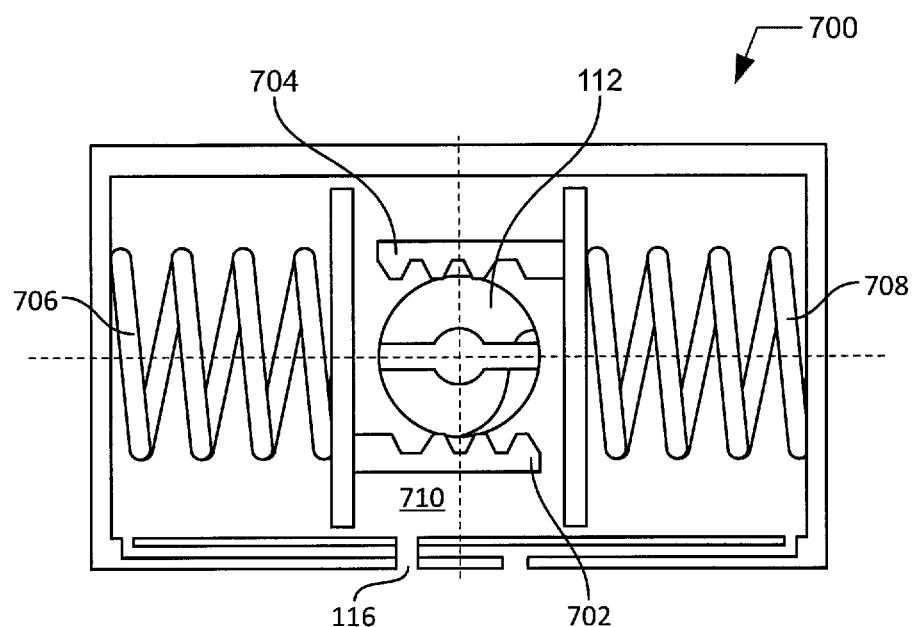
FIG. 7 illustrates the example actuator of FIGS. 1-2 configured as an example single-acting actuator having an example fail to open failure configuration.

FIG. 7 illustrates the example actuator 102 of FIGS. 1-2 configured as an example single-acting actuator 700 having an example fail to open failure configuration. The single-acting actuator 700 of FIG. 7 includes the example drive shaft 112 described above in connection with FIGS. 1-3. In the illustrated example of FIG. 7, the drive shaft 112 mates with and/or engages example first and second racks 702, 704 such that a rack and pinion configuration exists between the drive shaft 112 and the first and second racks 702, 704. The first and second racks 702, 704 are respectively coupled to example first and second return springs 706, 708. In the illustrated example of FIG. 7, forces exerted by the first and second return springs 706, 708 on the first and second racks 702, 704 have caused the first and second racks 702, 704 to converge inwardly toward one another and, accordingly, for the drive shaft 112 to have rotated in a counter-clockwise direction into the position illustrated in FIG. 7. In the illustrated example of FIG. 7, the rotation of the drive shaft 112 in a counter-clockwise direction corresponds to opening a flow control member of a valve (e.g., the flow control member 110 of the valve 104 of FIGS. 1-2) to which the single-acting actuator 700 is operatively coupled. Thus, the open position of the drive shaft 112 illustrated in FIG. 7 corresponds to the failure position and/or failure configuration of the single-acting actuator 700.

When a pressurized control fluid is supplied to the first port 116 of the single-acting actuator 700 of FIG. 7, a corresponding increase in pressure is introduced to an example first area 710. The increase in pressure within the first area 710 causes the first and second racks 702, 704 to expand outwardly away from one another and, accordingly, for the drive shaft 112 to rotate in a clockwise direction. When the supply of the pressurized control fluid to the first port 116 fails and/or ceases, the return springs 706, 708 cause the drive shaft 112 to rotate in a counter-clockwise direction back to the open position corresponding to the failure position of the single-acting actuator 700.

Figure 8:
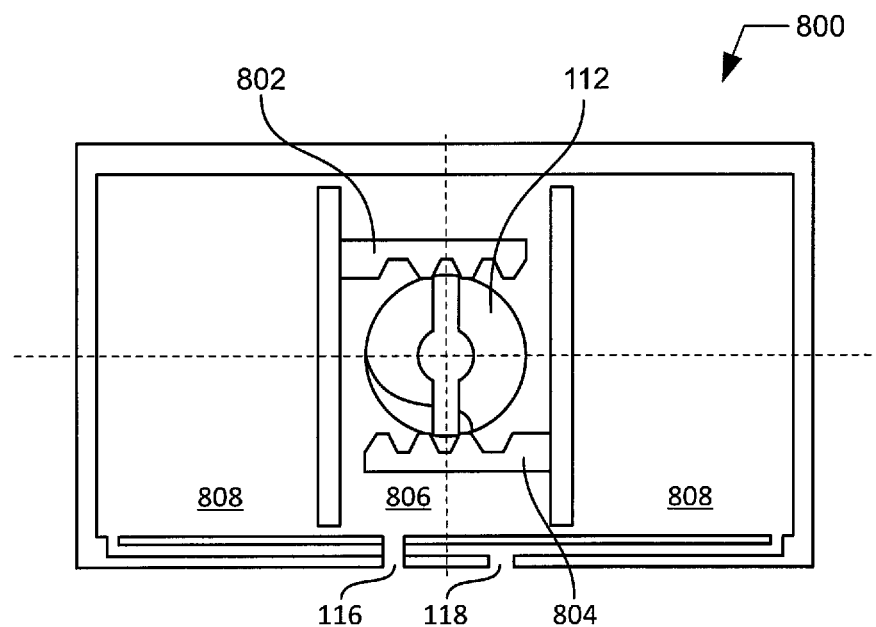
FIG. 8 illustrates the example actuator of FIGS. 1-2 configured as an example double-acting actuator having a first example fail in last position failure configuration.

FIG. 8 illustrates the example actuator 102 of FIGS. 1-2 configured as an example double-acting actuator 800 having a first example fail in last position failure configuration. The double-acting actuator 800 of FIG. 8 includes the example drive shaft 112 described above in connection with FIGS. 1-3. In the illustrated example of FIG. 8, the drive shaft 112 mates with and/or engages example first and second racks 802, 804 such that a rack and pinion configuration exists between the drive shaft 112 and the first and second racks 802, 804. When a pressurized control fluid is supplied to the first port 116 of the double-acting actuator 800 of FIG. 8, a corresponding increase in pressure is introduced to an example first area 806. The increase in pressure within the first area 806 causes the first and second racks 802, 804 to expand outwardly away from one another and, accordingly, for the drive shaft 112 to rotate in a counter-clockwise direction. In the illustrated example of FIG. 8, the rotation of the drive shaft 112 in a counter-clockwise direction corresponds to opening a flow control member of a valve (e.g., the flow control member 110 of the valve 104 of FIGS. 1-2) to which the double-acting actuator 800 is operatively coupled.

Conversely, when a pressurized control fluid is supplied to the second port 118 of the double-acting actuator 800 of FIG. 8, a corresponding increase in pressure is introduced to example second areas 808. The increase in pressure within the second areas 808 causes the first and second racks 802, 804 to converge inwardly toward one another and, accordingly, for the drive shaft 112 to rotate in a clockwise direction into the position illustrated in FIG. 8. In the illustrated example of FIG. 8, the rotation of the drive shaft 112 in a clockwise direction corresponds to closing a flow control member of a valve (e.g., the flow control member 110 of the valve 104 of FIGS. 1-2) to which the double-acting actuator 800 is operatively coupled. In the illustrated example of FIG. 8, the drive shaft 112 of the double-acting actuator 800 maintains its current position when supply of the pressurized control fluid to both of the first and second ports 116, 118 fails and/or ceases. Accordingly, the double-acting actuator 800 has a fail in last position failure configuration.

Figure 9:
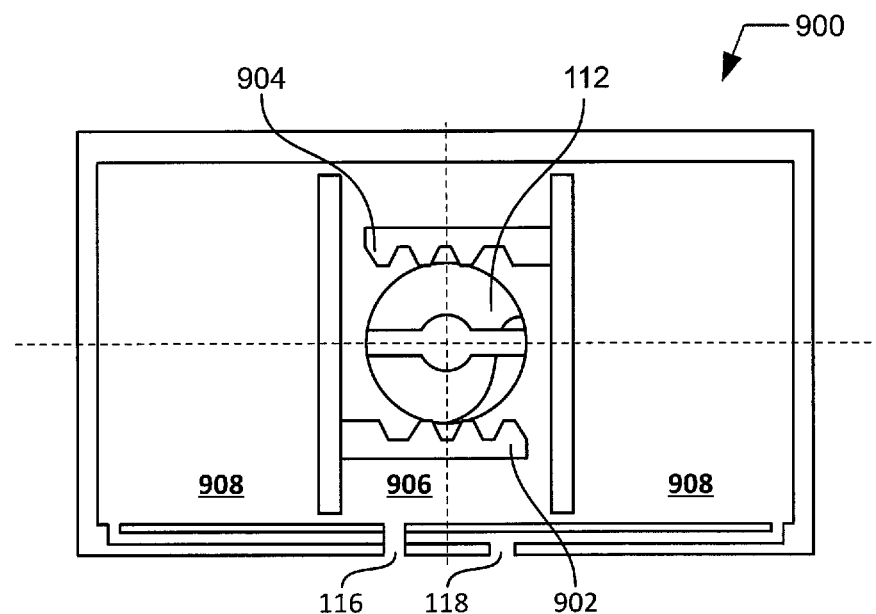
FIG. 9 illustrates a second example of the example actuator of FIGS. 1-2 configured as an example double-acting actuator having a second example fail in last position failure configuration.

FIG. 9 illustrates the example actuator 102 of FIGS. 1-2 configured as an example double-acting actuator 900 having a second example fail in last position failure configuration. The double-acting actuator 900 of FIG. 9 includes the example drive shaft 112 described above in connection with FIGS. 1-3. In the illustrated example of FIG. 9, the drive shaft 112 mates with and/or engages example first and second racks 902, 904 such that a rack and pinion configuration exists between the drive shaft 112 and the first and second racks 902, 904. When a pressurized control fluid is supplied to the first port 116 of the double-acting actuator 900 of FIG. 9, a corresponding increase in pressure is introduced to an example first area 906. The increase in pressure within the first area 906 causes the first and second racks 902, 904 to expand outwardly away from one another and, accordingly, for the drive shaft 112 to rotate in a clockwise direction. In the illustrated example of FIG. 9, the rotation of the drive shaft 112 in a clockwise direction corresponds to closing a flow control member of a valve (e.g., the flow control member 110 of the valve 104 of FIGS. 1-2) to which the double-acting actuator 900 is operatively coupled.

Conversely, when a pressurized control fluid is supplied to the second port 118 of the double-acting actuator 900 of FIG. 9, a corresponding increase in pressure is introduced to example second areas 908. The increase in pressure within the second areas 908 causes the first and second racks 902, 904 to converge inwardly toward one another and, accordingly, for the drive shaft 112 to rotate in a counter-clockwise direction into the position illustrated in FIG. 9. In the illustrated example of FIG. 9, the rotation of the drive shaft 112 in a counter-clockwise direction corresponds to opening a flow control member of a valve (e.g., the flow control member 110 of the valve 104 of FIGS. 1-2) to which the double-acting actuator 900 is operatively coupled.

In the illustrated example of FIG. 9, the drive shaft 112 of the double-acting actuator 900 maintains its current position when supply of the pressurized control fluid to both of the first and second ports 116, 118 fails and/or ceases. Accordingly, the double-acting actuator 900 has a fail in last position failure configuration.

Flowcharts representative of example methods for automatically detecting the failure configuration of the example actuator 102 of FIGS. 1 and 2 are shown in FIGS. 10, 11A, 11B, 12A and 12B. In these examples, the methods may be implemented using machine-readable instructions that comprise one or more program(s) for execution by a processor such as the processor 1312 shown in the example processor platform 1300 discussed below in connection with FIG. 13. The one or more program(s) may be embodied in software stored on a tangible computer readable storage medium such as a CD-ROM, a floppy disk, a hard drive, a digital versatile disk (DVD), a Blu-ray disk, or a memory associated with the processor 1312, but the entire program(s) and/or parts thereof could alternatively be executed by a device other than the processor 1312 and/or embodied in firmware or dedicated hardware. Further, although the example program(s) is/are described with reference to the flowcharts illustrated in FIGS. 10, 11A, 11B, 12A and 12B, many other methods for automatically detecting the failure configuration of the example actuator 102 of FIGS. 1 and 2 may alternatively be used. For example, the order of execution of the blocks may be changed, and/or some of the blocks described may be changed, eliminated, or combined.

As mentioned above, the example methods of FIGS. 10, 11A, 11B, 12A and 12B may be implemented using coded instructions (e.g., computer and/or machine-readable instructions) stored on a tangible computer readable storage medium such as a hard disk drive, a flash memory, a read-only memory (ROM), a compact disk (CD), a digital versatile disk (DVD), a cache, a random-access memory (RAM) and/or any other storage device or storage disk in which information is stored for any duration (e.g., for extended time periods, permanently, for brief instances, for temporarily buffering, and/or for caching of the information). As used herein, the term "tangible computer readable storage medium" is expressly defined to include any type of computer readable storage device and/or storage disk and to exclude propagating signals and to exclude transmission media. As used herein, "tangible computer readable storage medium" and "tangible machine readable storage medium" are used interchangeably. Additionally or alternatively, the example methods of FIGS. 10, 11A, 11B, 12A and 12B may be implemented using coded instructions (e.g., computer and/or machine-readable instructions) stored on a non-transitory computer and/or machine-readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term "non-transitory computer readable medium" is expressly defined to include any type of computer readable storage device and/or storage disk and to exclude propagating signals and to exclude transmission media. As used herein, when the phrase "at least" is used as the transition term in a preamble of a claim, it is open-ended in the same manner as the term "comprising" is open ended.

Figure 10:
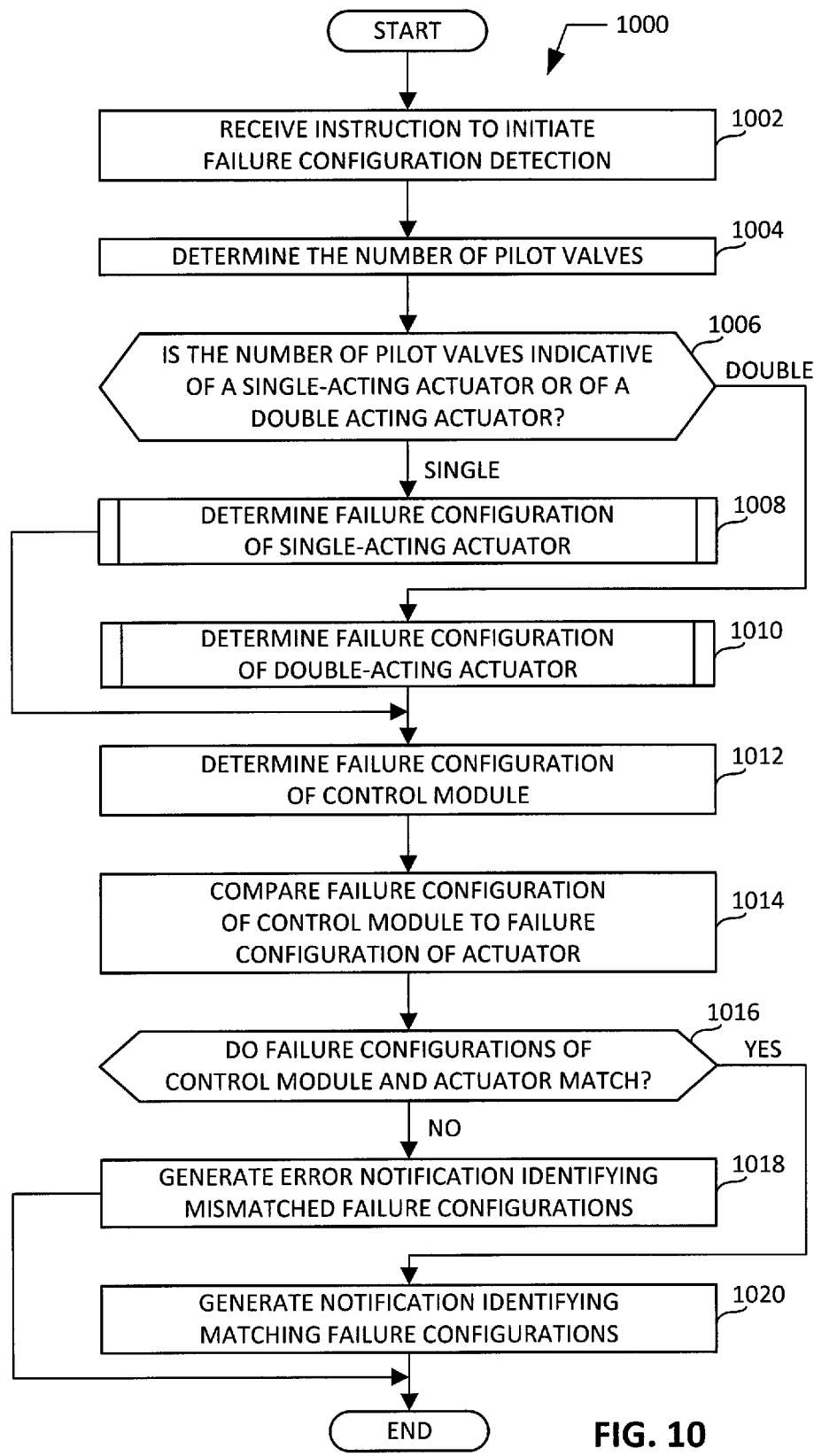
FIG. 10 is a flowchart representative of an example method that may be executed to automatically detect the failure configuration of the example actuator of FIG. 1.

FIG. 10 is a flowchart representative of an example method that may be executed to automatically detect the failure configuration of the example actuator of FIG. 1. The example method 1000 of FIG. 10 begins when the configuration engine 132 and/or, more generally, the control module 108 of FIG. 1 receives a signal and/or instruction to initiate a failure configuration detection process (block 1002). For example, the configuration engine 132 and/or, more generally, the control module 108 may receive a signal and/or instruction via the user interface 134 of FIG. 1 indicating that the configuration engine 132 is to initiate a failure configuration detection process. The initiation instruction and/or signal may be generated by the user interface 134 in response to an end user of the failure configuration detection apparatus 100 of FIG. 1 providing input via one or more input device(s) (e.g., buttons, switches, a keyboard, a mouse, a microphone and/or a liquid crystal display having a touchscreen) of the user interface 134. As another example, the configuration engine 132 and/or, more generally, the control module 108 may receive the initiation signal and/or instruction from the communication terminal 138 of FIG. 1.

The configuration engine 132 of FIG. 1 determines the number of pilot valves included in the control module 108 of FIG. 1 (block 1004). For example, the configuration engine 132 may determine that the control module 108 includes only one pilot valve such as, for example, the first pilot valve 126 of FIG. 1. As another example, the configuration engine 132 may determine that the control module 108 includes two pilot valves such as, for example, the first and second pilot valves 126, 128 of FIG. 1. In some examples, the configuration engine 132 determines the number of pilot valves included in the control module by accessing data stored in the data repository 136 of FIG. 1 that identifies and/or indicates the number of pilot valves included in the control module 108.

The configuration engine 132 of FIG. 1 determines whether the number of pilot valves is indicative of the actuator 102 of FIG. 1 being a single-acting actuator or a double acting actuator (block 1006). For example, the configuration engine 132 may determine that the control module 108 includes only a single pilot valve (e.g., the first pilot valve 126 of FIG. 1), and that the inclusion of only a single pilot valve is indicative of the actuator 102 being a single-acting actuator (e.g., the example single-acting actuator 600 of FIG. 6 or the example single-acting actuator 700 of FIG. 7). Alternatively, the configuration engine 132 may determine that the control module 108 includes two pilot valves (e.g., the first and second pilot valves 126, 128 of FIG. 1), and that the inclusion of two pilot valves is indicative of the actuator 102 being a double-acting actuator (e.g., the example double-acting actuator 800 of FIG. 8 or the example double-acting actuator 900 of FIG. 9). If the configuration engine 132 determines at block 1006 that the number of pilot valves is indicative of the actuator 102 being a single-acting actuator, control of the example method 1000 proceeds to block 1008. If the configuration engine 132 instead determines at block 1006 that the number of pilot valves is indicative of the actuator 102 being a double-acting actuator, control of the example method 1000 proceeds to block 1010.

At block 1008, the configuration engine 132 of FIG. 1 determines the failure configuration of the actuator 102 of FIG. 1 configured as a single-acting actuator (e.g., the example single-acting actuator 600 of FIG. 6 or the example single-acting actuator 700 of FIG. 7) (block 1008). For example, the configuration engine 132 may determine that the actuator 102 is configured as a single-acting actuator having a fail to close failure configuration (e.g., the example single-acting actuator 600 having a fail to close failure configuration, as shown in FIG. 6). As another example, the configuration engine 132 may determine that the actuator 102 is configured as a single-acting actuator having a fail to open failure configuration (e.g., the example single-acting actuator 700 having a fail to open failure configuration, as shown in FIG. 7). An example process that may be used to implement block 1008 is described in greater detail below in connection with FIGS. 11A and 11B. Following block 1008, the example method proceeds to block 1012.

At block 1010, the configuration engine 132 of FIG. 1 determines the failure configuration of the actuator 102 of FIG. 1 configured as a double-acting actuator (e.g., the example double-acting actuator 800 of FIG. 8 or the example double-acting actuator 900 of FIG. 9) (block 1010). For example, the configuration engine 132 may determine that the actuator 102 is configured as a double-acting actuator having a fail in last position failure configuration (e.g., the example double-acting actuators 800, 900 having respective fail in last position failure configurations, as shown in FIGS. 8 and 9). An example process that may be used to implement block 1010 is described in greater detail below in connection with FIGS. 12A and 12B. Following block 1010, the example method proceeds to block 1012.

At block 1012, the configuration engine 132 of FIG. 1 determines the failure configuration of the control module 108 of FIG. 1 (block 1012). For example, the configuration engine 132 may determine the failure configuration of the control module 108 by accessing data stored in the data repository 136 of FIG. 1 that identifies and/or indicates the failure configuration of the control module 108.

The configuration engine 132 of FIG. 1 compares the determined failure configuration of the control module 108 of FIG. 1 to the determined failure configuration of the actuator 102 of FIG. 1 (block 1014). Based on the comparison, the configuration engine 132 determines whether the failure configuration of the control module 108 matches the failure configuration of the actuator 102 (block 1016). For example, the configuration engine 132 may determine that the control module 108 has a fail in last position failure configuration and that the actuator 102 has a fail to close failure configuration. In such an example, the configuration engine 132 determines that a failure configuration mismatch exists between the control module 108 and the actuator 102. If the configuration engine 132 determines at block 1016 that the respective failure configurations of the control module 108 and the actuator 102 do not match, control of the example method 1000 proceeds to block 1018. If the configuration engine 132 instead determines at block 1016 that the respective failure configurations of the control module 108 and the actuator 102 match, control of the example method 1000 proceeds to block 1020.

At block 1018, the configuration engine 132 of FIG. 1 generates an error notification, signal and/or message identifying and/or indicating the mismatched failure configurations of the control module 108 and the actuator 102 (block 1018). In some examples, the error notification, signal and/or message generated by the configuration engine 132 is conveyed to the user interface 134 and/or to the communication terminal 138 of FIG. 1 for presentation to an end user of the failure configuration detection apparatus 100 of FIG. 1. Following block 1018, the example method 1000 ends.

At block 1020, the configuration engine 132 of FIG. 1 generates a notification, signal and/or message identifying and/or indicating the matching failure configurations of the control module 108 and the actuator 102 (block 1020). In some examples, the notification, signal and/or message generated by the configuration engine 132 is conveyed to the user interface 134 and/or to the communication terminal 138 of FIG. 1 for presentation to an end user of the failure configuration detection apparatus 100 of FIG. 1. Following block 1020, the example method 1000 ends.

Figure 11A:
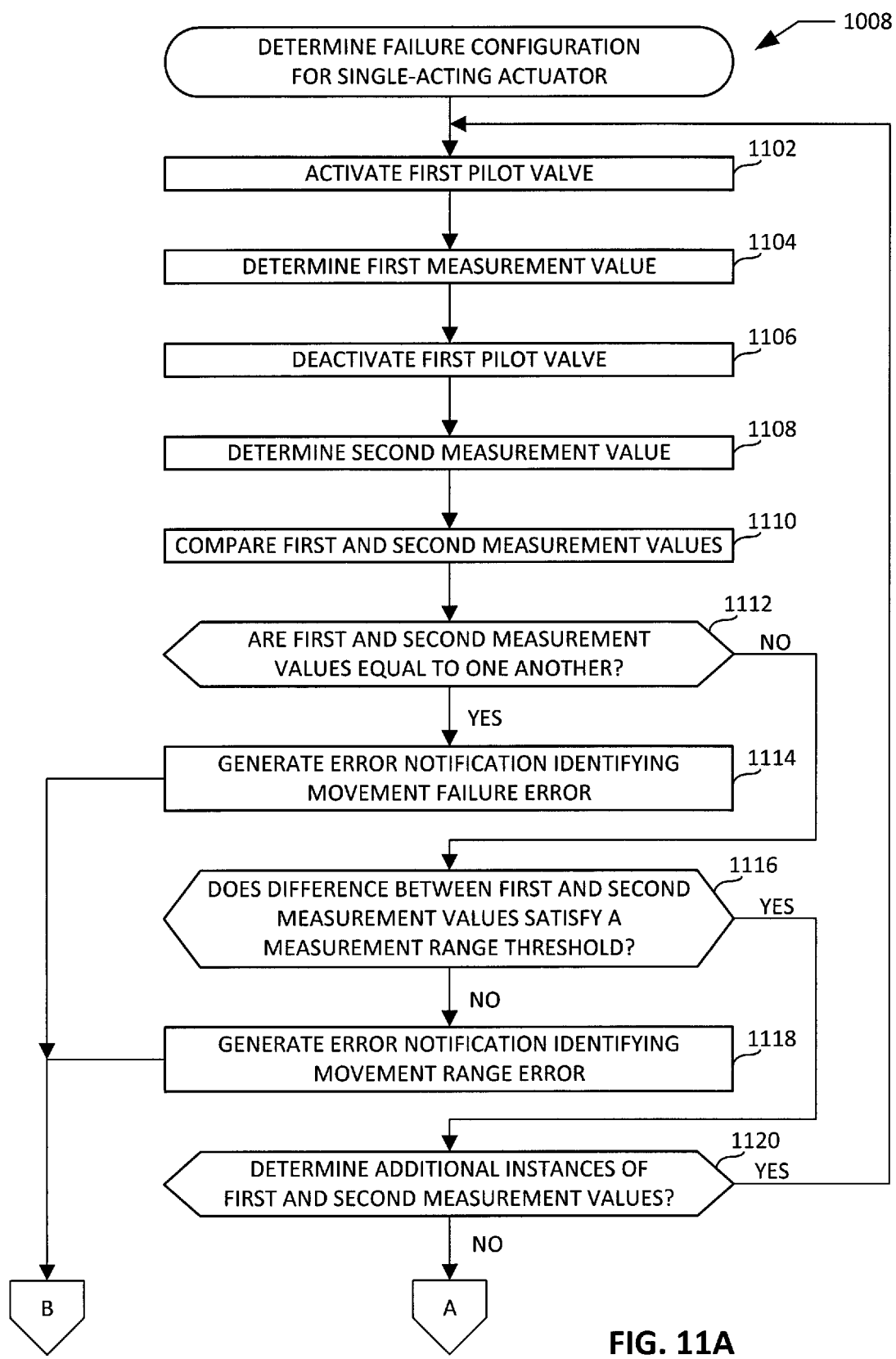
FIGS. 11A and 11B are a flowchart representative of an example method that may be executed to implement the example configuration engine of FIG. 1 to determine the failure configuration of the example actuator of FIG. 1 when the example actuator is a single-acting actuator.
Figure 11B:
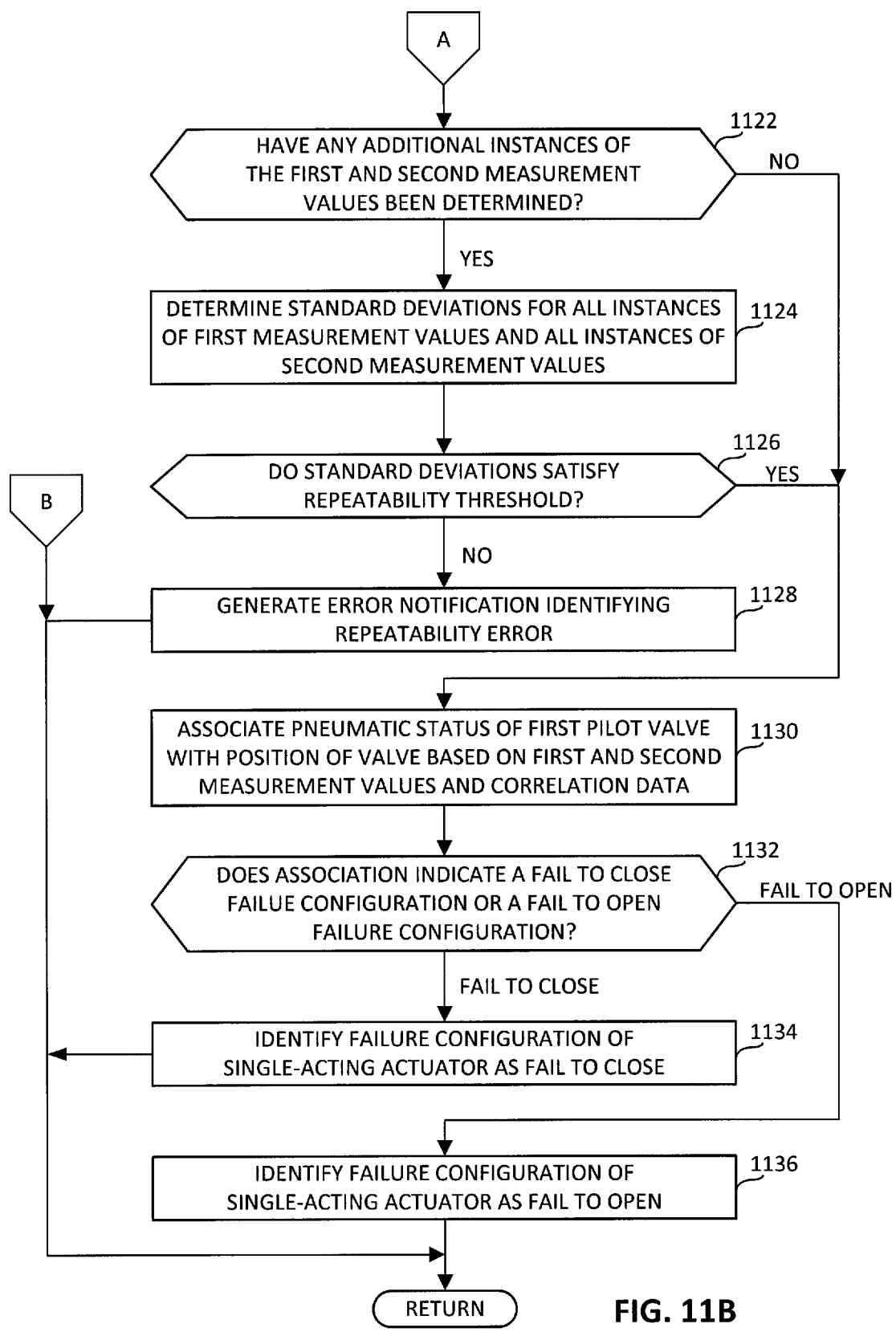

FIGS. 11A and 11B are a flowchart representative of an example method 1008 that may be executed to implement the example configuration engine 132 of FIG. 1 to determine the failure configuration of the example actuator 102 of FIG. 1 when the example actuator 102 is a single-acting actuator (e.g., the example single-acting actuator 600 of FIG. 6 or the example single-acting actuator 700 of FIG. 7). Example operations of blocks 1102, 1104, 1106, 1108, 1110, 1112, 1114, 1116, 1118, 1120, 1122, 1124, 1126, 1128, 1130, 1132, 1134 and 1136 of FIGS. 11A and 11B may be used to implement block 1008 of FIG. 10.

The example method 1008 of FIGS. 11A and 11B begins when the configuration engine 132 of FIG. 1 activates the first pilot valve 126 of the control module 108 of FIG. 1 (block 1102). For example, the configuration engine 132 activates (e.g., turns "ON") the first pilot valve 126 by transmitting an electronic control signal and/or instruction to the first pilot valve 126 that causes the first pilot valve 126 to generate a pneumatic control signal and/or instruction to the first control fluid outlet 122 of the pneumatic module 106 of FIG. 1. The pneumatic control signal and/or instruction causes the first control fluid outlet 122 to supply a pressurized control fluid to the first port 116 of the actuator 102 of FIG. 1, which in turn causes the drive shaft 112 of the actuator 102 and/or the position indicator 114 of the actuator 102 to achieve a first position such as, for example, the example position shown in FIG. 5.

In response to the activation of the first pilot valve 126, the configuration engine 132 of FIG. 1 determines a first measurement value (block 1104). For example, the configuration engine 132 may cause the first measurement value to be obtained by and/or collected from the position sensor 130 of FIG. 1 in response to the activation of the first pilot valve 126. In some examples, the configuration engine 132 may cause the first measurement value to be obtained following the expiration of a delay period that begins when the first pilot valve 126 is activated at block 1102. As described above, the activation of the first pilot valve 126 causes the drive shaft 112 of the actuator 102 and/or the position indicator 114 of the actuator to achieve the first position such as, for example, the example position shown in FIG. 5. Thus, the first measurement value corresponds to the first position achieved by the drive shaft 112 and/or the position indicator 114 in response to the activation of the first pilot valve 126.

Subsequent to the first measurement value being obtained and/or determined, the configuration engine 132 of FIG. 1 deactivates the first pilot valve 126 of the control module 108 of FIG. 1 (block 1106). For example, the configuration engine 132 deactivates (e.g., turns "OFF") the first pilot valve 126 by transmitting an electronic control signal and/or instruction to the first pilot valve 126 that causes the first pilot valve 126 to generate a pneumatic control signal and/or instruction to the first control fluid outlet 122 of the pneumatic module 106 of FIG. 1. The pneumatic control signal and/or instruction causes the first control fluid outlet 122 to cease supplying a pressurized control fluid to the first port 116 of the actuator 102 of FIG. 1, which in turn causes the drive shaft 112 of the actuator 102 and/or the position indicator 114 of the actuator 102 to achieve a second position such as, for example, the example position shown in FIG. 4.

In response to the deactivation of the first pilot valve 126, the configuration engine 132 of FIG. 1 determines a second measurement value (block 1108). For example, the configuration engine 132 may cause the second measurement value to be obtained by and/or collected from the position sensor 130 of FIG. 1 in response to the deactivation of the first pilot valve 126. In some examples, the configuration engine 132 may cause the second measurement value to be obtained following the expiration of a delay period that begins when the first pilot valve 126 is deactivated at block 1106. As described above, the deactivation of the first pilot valve 126 causes the drive shaft 112 of the actuator 102 and/or the position indicator 114 of the actuator to achieve the second position such as, for example, the example position shown in FIG. 4. Thus, the second measurement value corresponds to the second position achieved by the drive shaft 112 and/or the position indicator 114 in response to the deactivation of the first pilot valve 126.

The configuration engine 132 of FIG. 1 compares the first and second measurement values (block 1110). For example, in response to the first pilot valve 126 having been activated, the configuration engine 132 may have determined the first measurement value with the drive shaft 112 and/or the position indicator 114 of the actuator 102 being in the example first position shown in FIG. 5. In response to the first pilot valve 126 having been deactivated, the configuration engine 132 may have determined the second measurement value with the drive shaft 112 and/or the position indicator 114 of the actuator 102 being in the example second position shown in FIG. 4. In such an example, a comparison of the first and second measurement values by the configuration engine 132 will provide that the first measurement value is relatively greater than the second measurement value.

Based on the comparison, the configuration engine 132 determines whether the first and second measurement values are equal to one another (block 1112). For example, the configuration engine 132 may determine that the first and second measurement values are the same. If the configuration engine 132 determines at block 1112 that the first and second measurement values are equal to one another, control of the example method 1008 proceeds to block 1114. If the configuration engine 132 determines at block 1112 that the first and second measurement values are not equal to one another, control of the example method 1008 proceeds to block 1116.

At block 1114, the configuration engine 132 of FIG. 1 generates an error notification, signal and/or message identifying and/or indicating a movement failure error based on the first and second measurement values being equal to one another. In some examples, the error notification, signal and/or message generated by the configuration engine 132 is conveyed to the user interface 134 and/or to the communication terminal 138 of FIG. 1 for presentation to an end user of the failure configuration detection apparatus 100 of FIG. 1. Following block 1114, the example method 1008 ends and control returns to a calling function or process such as the example method 1000 of FIG. 10.

At block 1116, the configuration engine 132 of FIG. 1 determines whether the difference between the first and second measurement values satisfies a measurement range threshold. For example, the configuration engine 132 may determine that the difference between the first and second measurement values corresponds to an example movement range of seventy degrees that fails to satisfy an example movement range threshold of ninety degrees plus or minus one degree. If the configuration engine 132 determines at block 1116 that the difference between the first and second measurement values fails to satisfy the movement range threshold, control of the example method 1008 proceeds to block 1118. If the configuration engine 132 determines at block 1116 that the difference between the first and second measurement values satisfies the movement range threshold, control of the example method 1008 proceeds to block 1120.

At block 1118, the configuration engine 132 of FIG. 1 generates an error notification, signal and/or message identifying and/or indicating a movement range error based on the difference between the first and second measurement values failing to satisfy the movement range threshold. In some examples, the error notification, signal and/or message generated by the configuration engine 132 is conveyed to the user interface 134 and/or to the communication terminal 138 of FIG. 1 for presentation to an end user of the failure configuration detection apparatus 100 of FIG. 1. Following block 1118, the example method 1008 ends and control returns to a calling function or process such as the example method 1000 of FIG. 10.

At block 1120, the configuration engine 132 of FIG. 1 determines whether additional instances of the first and second measurement values are to be determined. For example, the configuration engine 132 may be configured to determine only a single instance of the first and second measurement values. Alternatively, the configuration engine 132 may be configured to determine multiple instances of the first and second measurement values. In some examples, the configuration engine 132 and/or, more generally, the control module 108 may receive a signal and/or instruction via the user interface 134 of FIG. 1 specifying and/or indicating whether the configuration engine 132 is to determine a single instance or multiple instances of the first and second measurement values. If the configuration engine 132 determines at block 1120 that no additional instances of the first and second measurement values are to be determined, control of the example method 1008 proceeds to block 1122. If the configuration engine 132 determines at block 1120 that additional instances of the first and second measurement values are to be determined, control of the example method 1008 returns to block 1102.

At block 1122, the configuration engine determines whether any additional instances of the first and second measurement values have been determined beyond the initial instance. If the configuration engine 132 determines at block 1122 that additional instances of the first and second measurement values have been determined, control of the example method 1008 proceeds to block 1124. If the configuration engine 132 determines at block 1122 that no additional instances of the first and second measurement values have been determined, control of the example method 1008 proceeds to block 1130.

At block 1124, the configuration engine 132 of FIG. 1 determines a first standard deviation for all instances of the first measurement value and a second standard deviation for all instances of the second measurement value. The configuration engine 132 of FIG. 1 determines whether the first and second standard deviations satisfy a repeatability threshold (block 1126). For example, the configuration engine 132 may determine that an example first standard deviation equal to 1.0 measurement units fails to satisfy an example repeatability threshold equal to 0.5 measurement units. If the configuration engine 132 determines at block 1126 that one or both of the first and/or second standard deviations fail(s) to satisfy the repeatability threshold, control of the example method 1008 proceeds to block 1128. If the configuration engine 132 determines at block 1126 that both of the first and second standard deviations satisfy the repeatability threshold, control of the example method 1008 proceeds to block 1130.

At block 1128, the configuration engine 132 of FIG. 1 generates an error notification, signal and/or message identifying and/or indicating a repeatability error based on the first and/or second standard deviation(s) failing to satisfy the repeatability threshold. In some examples, the error notification, signal and/or message generated by the configuration engine 132 is conveyed to the user interface 134 and/or to the communication terminal 138 of FIG. 1 for presentation to an end user of the failure configuration detection apparatus 100 of FIG. 1. Following block 1128, the example method 1008 ends and control returns to a calling function or process such as the example method 1000 of FIG. 10.

At block 1130, based on the compared first and second measurement values and further based on correlation data, the configuration engine 132 of FIG. 1 associates the respective pneumatic status (e.g., the "ON" or "OFF" status) of the first pilot valve 126 with a corresponding position of the flow control member 110 of the valve 104 to which the drive shaft 112 of the actuator 102 is operatively coupled. For example, correlation data such as that described above in connection with FIGS. 4 and 5 may indicate for a particular structural design and/or arrangement of the drive shaft 112, the position indicator 114 and/or the position sensor 130 that measurement values obtained by and/or collected from the position sensor 130 will always be relatively greater when the drive shaft 112 of the actuator 102 is in a position corresponding to an open position of the flow control member 110 of the valve 104 to which the drive shaft 112 is operatively coupled, in comparison to relatively lower measurement values obtained and/or collected when the drive shaft 112 of the actuator 102 is in a position corresponding to a closed position of the flow control member 110 of the valve 104. Based on such example correlation data and the example compared first and second measurement values described above (e.g., the first measurement value obtained with the first pilot valve 126 activated being relatively greater than the second measurement value obtained with the first pilot valve 126 deactivated), the configuration engine 132 associates the activated (e.g., "ON") status of the first pilot valve 126 with the open position of the flow control member 110 of the valve 104, and further associates the deactivated (e.g., "OFF") status of the first pilot valve 126 with the closed position of the flow control member 110 of the valve 104.

The configuration engine 132 of FIG. 1 determines whether the association is indicative of the actuator 102 of FIG. 1 having a fail to close failure configuration or a fail to open failure configuration (block 1132). For example, the example association resulting from the example correlation data and the example compared first and second measurement values described above indicates that the drive shaft 112 of the actuator 102 achieves a position corresponding to the flow control member 110 of the valve 102 being in a closed position when the first pilot valve 126 is deactivated (e.g., "OFF"). In such an example, the configuration engine 132 determines that the example association is indicative of the actuator 102 having a fail to close failure configuration. If the configuration engine 132 determines at block 1132 that the association is indicative of the actuator 102 having a fail to close failure configuration, control of the example method 1008 proceeds to block 1134. If the configuration engine 132 determines at block 1132 that the association is indicative of the actuator 102 having a fail to open failure configuration, control of the example method 1008 proceeds to block 1136.

At block 1134, the configuration engine 132 of FIG. 1 identifies, detects and/or determines that the actuator 102 is a single-acting actuator having a fail to close failure configuration (e.g., the example single-acting actuator 600 having a fail to close failure configuration, as shown in FIG. 6). Following block 1134, the example method 1008 ends and control returns to a calling function or process such as the example method 1000 of FIG. 10.

At block 1136, the configuration engine 132 of FIG. 1 identifies, detects and/or determines that the actuator 102 is a single-acting actuator having a fail to open failure configuration (e.g., the example single-acting actuator 700 having a fail to open failure configuration, as shown in FIG. 7). Following block 1136, the example method 1008 ends and control returns to a calling function or process such as the example method 1000 of FIG. 10.

Figure 12A:
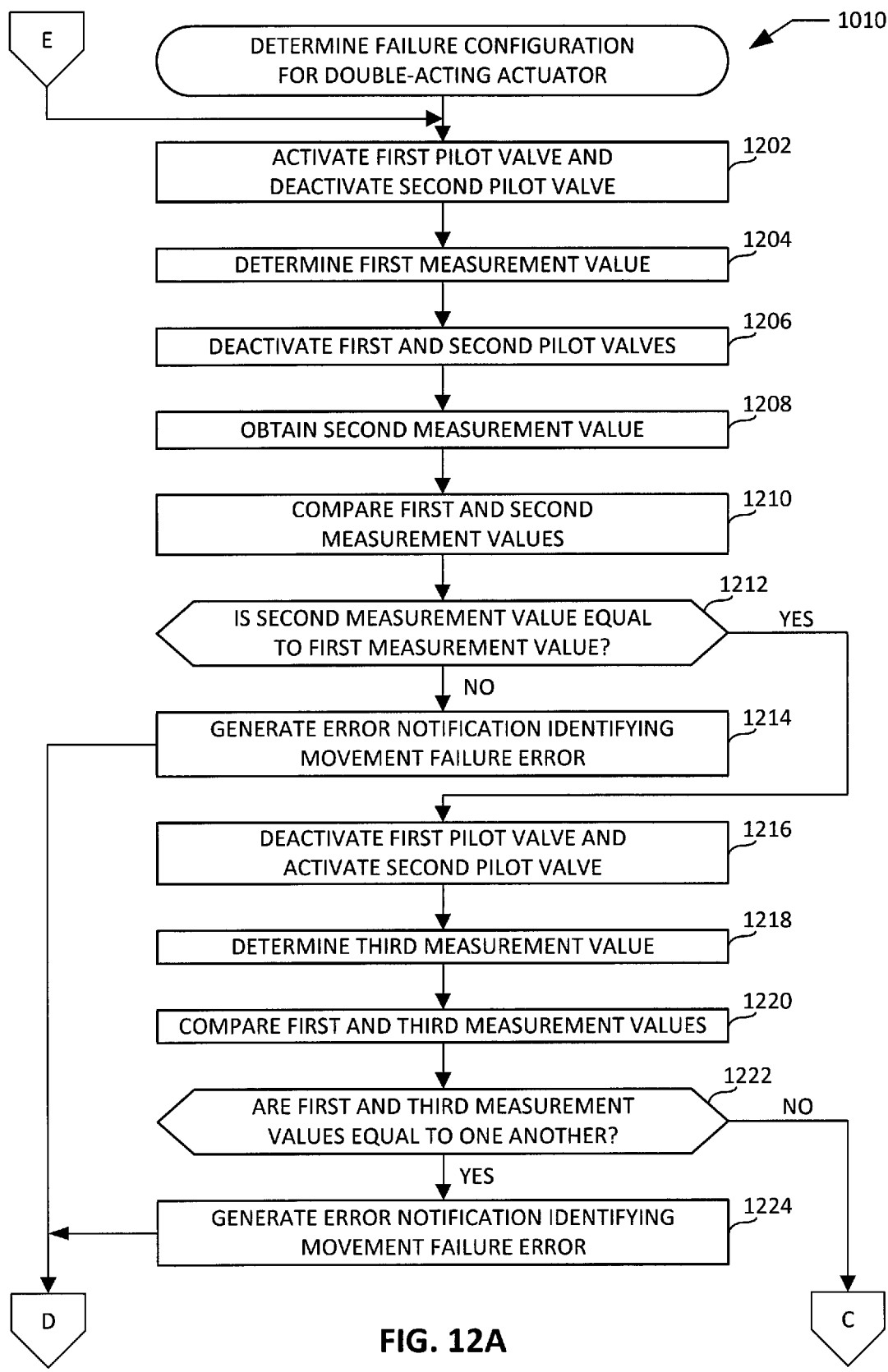
FIGS. 12A and 12B are a flowchart representative of an example method that may be executed to implement the example configuration engine of FIG. 1 to determine the failure configuration of the example actuator of FIG. 1 when the example actuator is a double-acting actuator.
Figure 12B:
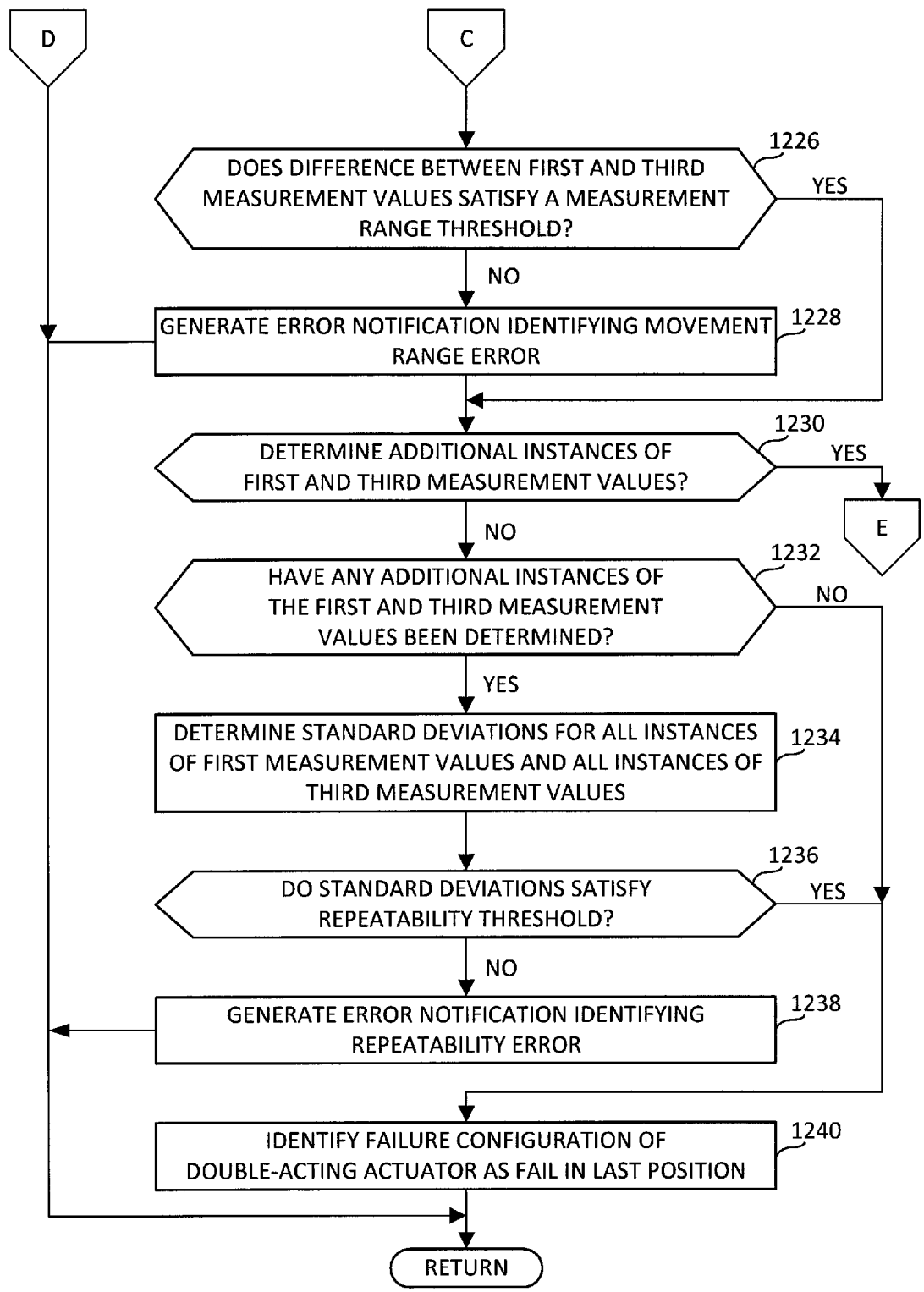

FIGS. 12A and 12B are a flowchart representative of an example method 1010 that may be executed to implement the example configuration engine 132 of FIG. 1 to determine the failure configuration of the example actuator of FIG. 1 when the example actuator 102 is a double-acting actuator (e.g., the example double-acting actuator 800 of FIG. 8 or the example double-acting actuator 900 of FIG. 9). Example operations of blocks 1202, 1204, 1206, 1208, 1210, 1212, 1214, 1216, 1218, 1220, 1222, 1224, 1226, 1228, 1230, 1232, 1234, 1236, 1238 and 1240 of FIGS. 12A and 12B may be used to implement block 1010 of FIG. 10.

The example method 1010 of FIGS. 12A and 12B begins when the configuration engine 132 of FIG. 1 activates the first pilot valve 126 and deactivates the second pilot valve 128 of the control module 108 of FIG. 1 (block 1202). For example, the configuration engine 132 activates (e.g., turns "ON") the first pilot valve 126 by transmitting an electronic control signal and/or instruction to the first pilot valve 126 that causes the first pilot valve 126 to generate a pneumatic control signal and/or instruction to the first control fluid outlet 122 of the pneumatic module 106 of FIG. 1. The configuration engine 132 also deactivates (e.g., turns "OFF") the second pilot valve 128 by transmitting an electronic control signal and/or instruction to the second pilot valve 128 that causes the second pilot valve 128 to generate a pneumatic control signal and/or instruction to the second control fluid outlet 124 of the pneumatic module 106 of FIG. 1. The respective pneumatic control signals and/or instructions cause the first control fluid outlet 122 to supply a pressurized control fluid to the first port 116 of the actuator 102 of FIG. 1, and further cause the second control fluid outlet 124 to cease supplying the pressurized fluid to the second port 118 of the actuator 102 of FIG. 1. As a result, the drive shaft 112 of the actuator 102 and/or the position indicator 114 of the actuator 102 achieves a first position such as, for example, the example position shown in FIG. 5.

In response to the activation of the first pilot valve 126 and deactivation of the second pilot valve 128, the configuration engine 132 of FIG. 1 determines a first measurement value (block 1204). For example, the configuration engine 132 may cause the first measurement value to be obtained by and/or collected from the position sensor 130 of FIG. 1 in response to the activation of the first pilot valve 126 and deactivation of the second pilot valve 128. In some examples, the configuration engine 132 may cause the first measurement value to be obtained following the expiration of a delay period that begins when the first pilot valve 126 is activated and the second pilot valve 128 is deactivated at block 1202. As described above, the activation of the first pilot valve 126 and deactivation of the second pilot valve 128 causes the drive shaft 112 of the actuator 102 and/or position indicator 114 of the actuator to achieve the first position such as, for example, the example position shown in FIG. 5. Thus, the first measurement value corresponds to the first position achieved by the drive shaft 112 and/or the position indicator 114 in response to the activation of the first pilot valve 126 and deactivation of the second pilot valve 128.

Subsequent to the first measurement value being obtained and/or determined, the configuration engine 132 of FIG. 1 deactivates both the first pilot valve 126 and the second pilot valve 128 of the control module 108 of FIG. 1 (block 1206). For example, the configuration engine 132 deactivates (e.g., turns "OFF") the first and second pilot valves 126, 128 by transmitting one or more electronic control signal(s) and/or instruction(s) to the first and second pilot valves 126, 128 that cause the first and second pilot valves 126, 128 to generate one or more pneumatic control signal(s) and/or instruction(s) to the first and second control fluid outlets 122, 124 of the pneumatic module 106 of FIG. 1. The pneumatic control signal(s) and/or instruction(s) cause the first and second control fluid outlets 122, 124 to cease supplying a pressurized control fluid to the first and second ports 116, 118 of the actuator 102 of FIG. 1. As a result, the drive shaft 112 of the actuator 102 and/or the position indicator 114 of the actuator 102 achieves a second position which may be, for example, the example position shown in FIG. 5.

In response to the deactivation of the first and second pilot valves 126, 128, the configuration engine 132 of FIG. 1 determines a second measurement value (block 1208). For example, the configuration engine 132 may cause the second measurement value to be obtained by and/or collected from the position sensor 130 of FIG. 1 in response to the deactivation of the first and second pilot valves 126, 128. In some examples, the configuration engine 132 may cause the second measurement value to be obtained following the expiration of a delay period that begins when the first pilot and second pilot valves 126, 128 are deactivated at block 1206. As described above, the deactivation of the first and second pilot valves 126, 128 causes the drive shaft 112 of the actuator 102 and/or the position indicator 114 of the actuator to achieve the second position. Thus, the second measurement value corresponds to the second position achieved by the drive shaft 112 and/or the position indicator 114 in response to the deactivation of the first and second pilot valves 126, 128.

The configuration engine 132 of FIG. 1 compares the first and second measurement values (block 1210). For example, in response to the first pilot valve 126 having been activated and the second pilot valve 128 having been deactivated, the configuration engine 132 may have determined the first measurement value with the drive shaft 112 and/or the position indicator 114 of the actuator 102 being in the example position shown in FIG. 5. In response to the first and second pilot valves 126, 128 having been deactivated, the configuration engine 132 may have determined the second measurement value with the drive shaft 112 and/or the position indicator 114 of the actuator 102 being in the example position shown in FIG. 5. In such an example, a comparison of the first and second measurement values by the configuration engine 132 will provide that the first and second measurement values are equal to one another.

Based on the comparison, the configuration engine 132 determines whether the second measurement value is equal to the first measurement value (block 1212). For example, the configuration engine 132 may determine that the second measurement value is not equal to the first measurement value. If the configuration engine 132 determines at block 1212 that the second measurement value is not equal to the first measurement value, control of the example method 1010 proceeds to block 1214. If the configuration engine 132 determines at block 1212 that the second measurement value is equal to the first measurement value, control of the example method 1010 proceeds to block 1216.

At block 1214, the configuration engine 132 of FIG. 1 generates an error notification, signal and/or message identifying and/or indicating a movement failure error based on the second measurement value not being equal to the first measurement value. In some examples, the error notification, signal and/or message generated by the configuration engine 132 is conveyed to the user interface 134 and/or to the communication terminal 138 of FIG. 1 for presentation to an end user of the failure configuration detection apparatus 100 of FIG. 1. Following block 1214, the example method 1010 ends and control returns to a calling function or process such as the example method 1000 of FIG. 10.

Subsequent to the first and second measurement values being obtained and/or determined, the configuration engine 132 of FIG. 1 deactivates the first pilot valve 126 and activates the second pilot valve 128 of the control module 108 of FIG. 1 (block 1216). For example, the configuration engine 132 deactivates (e.g., turns "OFF") the first pilot valve 126 by transmitting an electronic control signal and/or instruction to the first pilot valve 126 that causes the first pilot valve 126 to generate a pneumatic control signal and/or instruction to the first control fluid outlet 122 of the pneumatic module 106 of FIG. 1. The configuration engine 132 also activates (e.g., turns "ON") the second pilot valve 128 by transmitting an electronic control signal and/or instruction to the second pilot valve 128 that causes the second pilot valve 128 to generate a pneumatic control signal and/or instruction to the second control fluid outlet 124 of the pneumatic module 106 of FIG. 1. The respective pneumatic control signals and/or instructions cause the first control fluid outlet 122 to cease supplying a pressurized control fluid to the first port 116 of the actuator 102 of FIG. 1, and further cause the second control fluid outlet 124 to supply the pressurized fluid to the second port 118 of the actuator 102 of FIG. 1. As a result, the drive shaft 112 of the actuator 102 and/or the position indicator 114 of the actuator 102 achieves a third position such as, for example, the example position shown in FIG. 4.

In response to the deactivation of the first pilot valve 126 and activation of the second pilot valve 128, the configuration engine 132 of FIG. 1 determines a third measurement value (block 1218). For example, the configuration engine 132 may cause the third measurement value to be obtained by and/or collected from the position sensor 130 of FIG. 1 in response to the deactivation of the first pilot valve 126 and activation of the second pilot valve 128. In some examples, the configuration engine 132 may cause the third measurement value to be obtained following the expiration of a delay period that begins when the first pilot valve 126 is deactivated and the second pilot valve 128 is activated at block 1206. As described above, the deactivation of the first pilot valve 126 and activation of the second pilot valve 128 causes the drive shaft 112 of the actuator 102 and/or the position indicator 114 of the actuator to achieve the third position such as, for example, the example position shown in FIG. 4. Thus, the third measurement value corresponds to the third position achieved by the drive shaft 112 and/or the position indicator 114 in response to the deactivation of the first pilot valve 126 and activation of the second pilot valve 128.

The configuration engine 132 of FIG. 1 compares the first and third measurement values (block 1220). For example, in response to the first pilot valve 126 having been activated and the second pilot valve 128 having been deactivated, the configuration engine 132 may have determined the first measurement value with the drive shaft 112 and/or the position indicator 114 of the actuator 102 being in the example first position shown in FIG. 5. In response to the first pilot valve 126 having been deactivated and the second pilot valve 128 having been activated, the configuration engine 132 may have determined the third measurement value with the drive shaft 112 and/or the position indicator 114 of the actuator 102 being in the example third position shown in FIG. 4. In such an example, a comparison of the first and third measurement values by the configuration engine 132 will provide that the first measurement value is relatively greater than the third measurement value.

Based on the comparison, the configuration engine 132 determines whether the first and third measurement values are equal to one another (block 1222). For example, the configuration engine 132 may determine that the first and third measurement values are the same. If the configuration engine 132 determines at block 1222 that the first and third measurement values are equal to one another, control of the example method 1010 proceeds to block 1224. If the configuration engine 132 determines at block 1222 that the first and third measurement values are not equal to one another, control of the example method 1010 proceeds to block 1226.

At block 1224, the configuration engine 132 of FIG. 1 generates an error notification, signal and/or message identifying and/or indicating a movement failure error based on the first and third measurement values being equal to one another. In some examples, the error notification, signal and/or message generated by the configuration engine 132 is conveyed to the user interface 134 and/or to the communication terminal 138 of FIG. 1 for presentation to an end user of the failure configuration detection apparatus 100 of FIG. 1. Following block 1224, the example method 1010 ends and control returns to a calling function or process such as the example method 1000 of FIG. 10.

At block 1226, the configuration engine 132 of FIG. 1 determines whether the difference between the first and third measurement values satisfies a measurement range threshold. For example, the configuration engine 132 may determine that the difference between the first and third measurement values corresponds to an example movement range of seventy degrees that fails to satisfy an example movement range threshold of ninety degrees plus or minus one degree. If the configuration engine 132 determines at block 1226 that the difference between the first and third measurement values fails to satisfy the movement range threshold, control of the example method 1010 proceeds to block 1228. If the configuration engine 132 determines at block 1226 that the difference between the first and third measurement values satisfies the movement range threshold, control of the example method 1010 proceeds to block 1230.

At block 1228, the configuration engine 132 of FIG. 1 generates an error notification, signal and/or message identifying and/or indicating a movement range error based on the difference between the first and third measurement values failing to satisfy the movement range threshold. In some examples, the error notification, signal and/or message generated by the configuration engine 132 is conveyed to the user interface 134 and/or to the communication terminal 138 of FIG. 1 for presentation to an end user of the failure configuration detection apparatus 100 of FIG. 1. Following block 1228, the example method 1010 ends and control returns to a calling function or process such as the example method 1000 of FIG. 10.

At block 1230, the configuration engine 132 of FIG. 1 determines whether additional instances of the first and third measurement values are to be determined. For example, the configuration engine 132 may be configured to determine only a single instance of the first and third measurement values. Alternatively, the configuration engine 132 may be configured to determine multiple instances of the first and third measurement values. In some examples, the configuration engine 132 and/or, more generally, the control module 108 may receive a signal and/or instruction via the user interface 134 of FIG. 1 specifying and/or indicating whether the configuration engine 132 is to determine a single instance or multiple instances of the first and third measurement values. If the configuration engine 132 determines at block 1230 that no additional instances of the first and third measurement values are to be determined, control of the example method 1010 proceeds to block 1232. If the configuration engine 132 determines at block 1320 that additional instances of the first and third measurement values are to be determined, control of the example method 1010 returns to block 1202.

At block 1232, the configuration engine determines whether any additional instances of the first and third measurement values have been determined beyond the initial instance. If the configuration engine 132 determines at block 1232 that additional instances of the first and third measurement values have been determined, control of the example method 1010 proceeds to block 1234. If the configuration engine 132 determines at block 1232 that no additional instances of the first and third measurement values have been determined, control of the example method 1010 proceeds to block 1240.

At block 1234, the configuration engine 132 of FIG. 1 determines a first standard deviation for all instances of the first measurement value and a second standard deviation for all instances of the third measurement value. The configuration engine 132 of FIG. 1 determines whether the first and second standard deviations satisfy a repeatability threshold (block 1226). For example, the configuration engine 132 may determine that an example first standard deviation equal to 1.0 measurement units fails to satisfy an example repeatability threshold equal to 0.5 measurement units. If the configuration engine 132 determines at block 1236 that one or both of the first and/or second standard deviations fail(s) to satisfy the repeatability threshold, control of the example method 1010 proceeds to block 1238. If the configuration engine 132 determines at block 1236 that both of the first and second standard deviations satisfy the repeatability threshold, control of the example method 1010 proceeds to block 1240.

At block 1238, the configuration engine 132 of FIG. 1 generates an error notification, signal and/or message identifying and/or indicating a repeatability error based on the first and/or second standard deviation(s) failing to satisfy the repeatability threshold. In some examples, the error notification, signal and/or message generated by the configuration engine 132 is conveyed to the user interface 134 and/or to the communication terminal 138 of FIG. 1. Following block 1238, the example method 1010 ends and control returns to a calling function or process such as the example method 1000 of FIG. 10.

At block 1240, the configuration engine 132 of FIG. 1 identifies, detects and/or determines that the actuator 102 is a double-acting actuator having a fail in last position failure configuration (e.g., either of the example double-acting actuators 800, 900 having a fail in last position failure configuration, as shown in FIGS. 8 and 9). In some examples, the configuration engine 132 determines that the actuator 102 is a double-acting actuator having a fail in last position failure configuration based on the configuration engine 132 having determined that the control module 108 includes a number of pilot valves that is indicative of the actuator 102 being a double-acting actuator. Following block 1240, the example method 1010 ends and control returns to a calling function or process such as the example method 1000 of FIG. 10.

Figure 13:
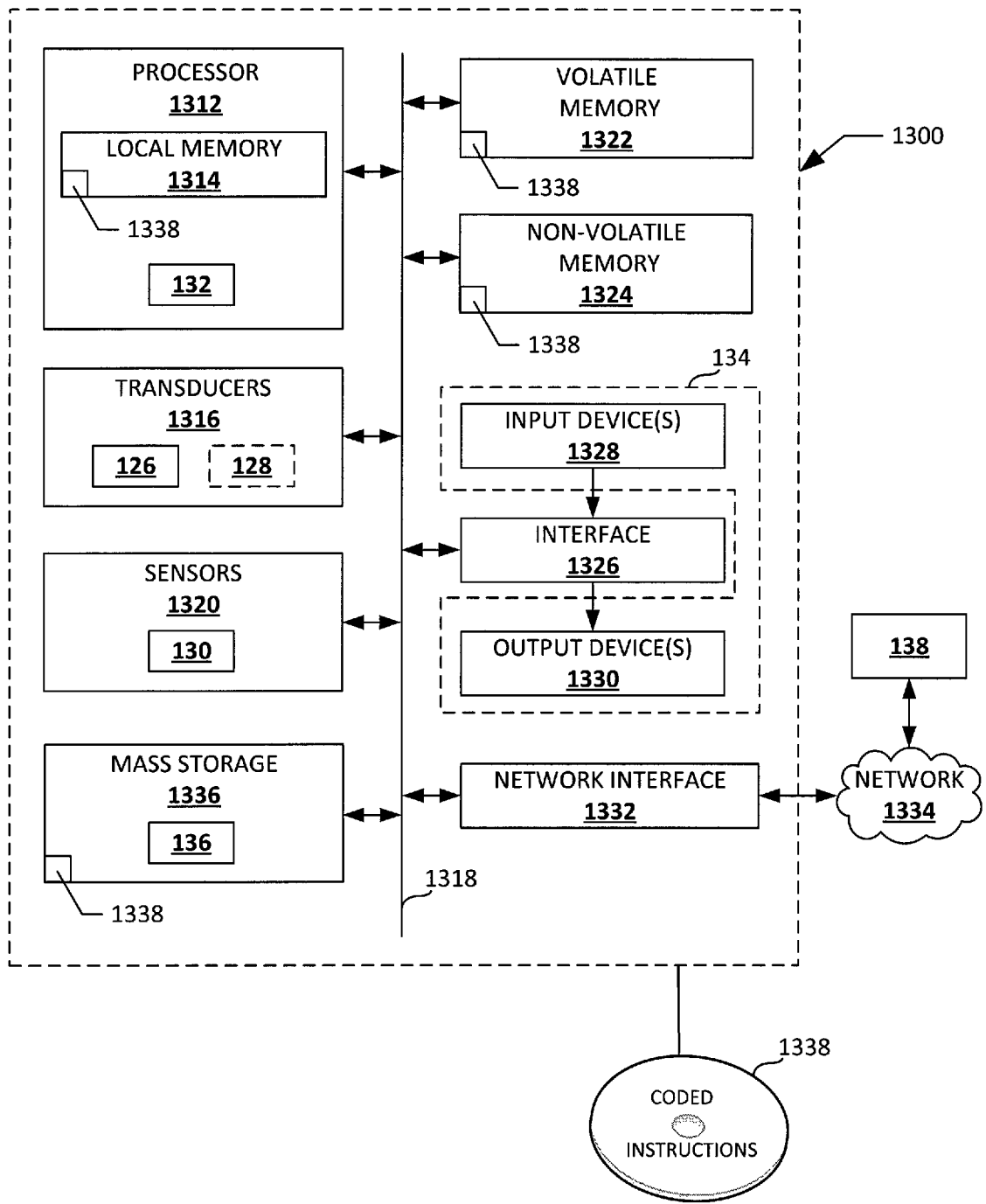
FIG. 13 is an example processor platform capable of executing instructions to implement the methods of FIGS. 10, 11A, 11B, 12A and 12B and the example control module of FIG. 1.

FIG. 13 is an example processor platform 1300 capable of executing instructions to implement the methods of FIGS. 10, 11A, 11B, 12A and 12B and the example control module 108 of FIG. 1. The processor platform 1300 can be, for example, a printed circuit board, a controller, a personal computer, or any other type of computing device.

The processor platform 1300 of the illustrated example includes a processor 1312. The processor 1312 of the illustrated example is hardware. For example, the processor 1312 can be implemented by one or more integrated circuits, logic circuits, microprocessors or controllers from any desired family or manufacturer. The example processor 1312 includes a local memory 1314 (e.g., a cache). The example processor 1312 also includes the example configuration engine 132 of FIG. 1.

The processor 1312 of the illustrated example is in communication with one or more example transducers 1316 via a bus 1318. The example transducers 1316 include the example first and second pilot valves 126, 128 of FIG. 1.

The processor 1312 of the illustrated example is also in communication with one or more example sensors 1320 via the bus 1318. The example sensors 1320 include the example position sensor 130 of FIG. 1.

The processor 1312 of the illustrated example is also in communication with a main memory including a volatile memory 1322 and a non-volatile memory 1324 via the bus 1318. The volatile memory 1322 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 1324 may be implemented by flash memory and/or any other desired type of memory device. Access to the main memory 1322, 1324 is controlled by a memory controller.

The processor platform 1300 of the illustrated example also includes an interface circuit 1326. The interface circuit 1326 may be implemented by any type of interface standard, such as an Ethernet interface, a universal serial bus (USB), and/or a PCI express interface. In the illustrated example, one or more input devices 1328 are connected to the interface circuit 1326. The input device(s) 1328 permit(s) a user to enter data and commands into the processor 1312. The input device(s) can be implemented by, for example, one or more buttons, one or more switches, a keyboard, a mouse, a microphone and/or a liquid crystal display having a touchscreen. One or more output devices 1330 are also connected to the interface circuit 1326 of the illustrated example. The output devices 1330 can be implemented, for example, by one or more light emitting diode(s) for presenting visual information, one or more speaker(s) for presenting audible information, and/or a display device (e.g., a liquid crystal display, a cathode ray tube display, etc.) for presenting textual and/or graphical information. The interface circuit 1326 of the illustrated example, thus, typically includes a graphics driver card, a graphics driver chip or a graphics driver processor. In the illustrated example, the input device(s) 1328 and the output device(s) 1330 collectively form the example user interface 134 of FIG. 1.

The processor platform 1300 of the illustrated example also includes a network interface circuit 1332. The network interface circuit 1332 may be implemented by any type of interface standard, such as an Ethernet interface, a universal serial bus (USB), and/or a PCI express interface. In the illustrated example, the network interface circuit 1332 facilitates the exchange of data and/or signals with external machines (e.g., a personal computer, laptop computer, etc.) such as the example communication terminal 138 of FIG. 1 via a network 1334 (e.g., a local area network (LAN), a wide area network (WAN), an Ethernet connection, a digital subscriber line (DSL), a telephone line, coaxial cable, etc.).

The processor platform 1300 of the illustrated example also includes one or more mass storage devices 1336 for storing software and/or data. Examples of such mass storage devices 1336 include floppy disk drives, hard drive disks, compact disk drives, Blu-ray disk drives, RAID systems, and digital versatile disk (DVD) drives. In the illustrated example, the mass storage device 1336 includes the example data repository 136 of FIG. 1.

Coded instructions 1338 to implement the methods of FIGS. 10, 11A, 11B, 12A and 12B may be stored in the local memory 1314, in the volatile memory 1322, in the non-volatile memory 1324, in the mass storage device 1336, and/or on a removable tangible computer readable storage medium such as a CD or DVD.

From the foregoing, it will be appreciated that the disclosed methods and apparatus advantageously provide for the automated determination and/or detection of a failure configuration of an actuator, and further provide for the automated determination and/or detection of a mismatch between the failure configuration of the actuator and the failure configuration of a control module operatively coupled to the actuator. Such automated determinations may advantageously identify the existence of undesirable safety and operational conditions, including the potential formation of adverse pressures and/or flow conditions that could result in explosion, implosion, overflow and/or mechanical or electrical failure of a system that includes the actuator and/or the control module. Furthermore, the disclosed methods and apparatus advantageously reduce and/or eliminate the errors that are prone to being generated from human involvement in the process of determining a failure configuration of an actuator.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. A method, comprising:
  determining, by executing an instruction with a processor, a number of pilot valves of a control module, the control module being operatively coupled to an actuator, the actuator being operatively coupled to a valve having a flow control member; and
  in response to determining that the number of pilot valves is equal to one, determining, by executing an instruction with the processor, whether a failure configuration of the actuator is a fail to close configuration or a fail to open configuration by:
   determining, by executing an instruction with the processor, a first position value measured in response to moving the flow control member in a first direction to a first position;
   determining, by executing an instruction with the processor, a second position value measured in response to moving the flow control member in a second direction opposite the first direction to a second position; and
   comparing, by executing an instruction with the processor, the first and second position values.

2. The method of claim 1, further comprising, in response to determining that the number of pilot valves is equal to two, determining, by executing an instruction with the processor, that the failure configuration of the actuator is a fail in last position configuration.

3. The method of claim 1, further including:
  determining, by executing an instruction with the processor, a failure configuration of the control module; and
  comparing, by executing an instruction with the processor, the failure configuration of the control module to the failure configuration of the actuator to determine the existence of a failure configuration mismatch between the control module and the actuator.

4. The method of claim 1, wherein determining whether the failure configuration of the actuator is a fail to close configuration or a fail to open configuration further includes:
  determining, by executing an instruction with the processor, a movement range associated with moving the flow control member from the first position to the second position, the movement range being based on the comparing of the first and second position values;
  comparing, by executing an instruction with a processor, the movement range to a movement range threshold; and
  generating, by executing an instruction with the processor, an error notification in response to determining that the movement range fails to satisfy the movement range threshold.

5. The method of claim 1, wherein determining whether the failure configuration of the actuator is a fail to close configuration or a fail to open configuration further includes:
  determining, by executing an instruction with the processor, a third position value measured in response to moving the flow control member in the first direction to the first position, the first and third position values being based on separate instances of moving the flow control member to the first position;
  determining, by executing an instruction with the processor, a standard deviation associated with the first and third position values;
  comparing, by executing an instruction with the processor, the standard deviation to a repeatability threshold; and
  generating, by executing an instruction with the processor, an error notification in response to determining that the standard deviation fails to satisfy the repeatability threshold.

6. The method of claim 1, wherein determining the first position value includes activating a first pilot valve of the control module, and wherein determining the second position value includes deactivating the first pilot valve of the control module.

7. The method of claim 1, wherein determining whether the failure configuration of the actuator is a fail to close configuration or a fail to open configuration further includes associating a pneumatic status of one of the control valves with a corresponding one of the first and second positions of the flow control member based on correlation data and further based on the comparison of the first and second position values.

8. An apparatus, comprising:
  memory including computer readable instructions; and
  a processor to execute the computer readable instructions to at least:

determine a number of pilot valves of a control module, the control module being operatively coupled to an actuator, the actuator being operatively coupled to a valve having a flow control member; and in response to determining that the number of pilot valves is equal to one, determine whether a failure configuration of the actuator is a fail to close configuration or a fail to open configuration by:

determining a first position value measured in response to moving the flow control member in a first direction to a first position;

determining a second position value measured in response to moving the flow control member in a second direction opposite the first direction to a second position; and comparing the first and second position values.

9. The apparatus of claim 8, wherein the wherein the processor is further to determine, in response to determining that the number of pilot valves is equal to two, that the failure configuration of the actuator is a fail in last position configuration.

10. The apparatus of claim 8, wherein the processor is further to:

determine a failure configuration of the control module; and compare the failure configuration of the control module to the failure configuration of the actuator to determine the existence of a failure configuration mismatch between the control module and the actuator.

11. The apparatus of claim 8, wherein the processor is further to determine whether the failure configuration of the actuator is a fail to close configuration or a fail to open configuration by:

determining a movement range associated with moving the flow control member from the first position to the second position, the movement range being based on the comparing of the first and second position values;

comparing the movement range to a movement range threshold; and generating an error notification in response to determining that the movement range fails to satisfy the movement range threshold.

12. The apparatus of claim 8, wherein the processor is further to determine whether the failure configuration of the actuator is a fail to close configuration or a fail to open configuration by:

determining a third position value in response to moving the flow control member in the first direction to the first position, the first and third position values being based on separate instances of moving the flow control member to the first position;

determining a standard deviation associated with the first and third position values;

comparing the standard deviation to a repeatability threshold; and generating an error notification in response to determining that the standard deviation fails to satisfy the repeatability threshold.

13. The apparatus of claim 8, wherein the processor is further to:

activate a first pilot valve of the control module in connection with determining the first position value; and deactivate the first pilot valve of the control module in connection with determining of the second position value.

14. The apparatus of claim 8, wherein the processor is further to determine whether the failure configuration of the actuator is a fail to close configuration or a fail to open configuration by associating a pneumatic status of one of the control valves with a corresponding one of the first and second positions of the flow control member based on correlation data and further based on the comparison of the first and second position values.

15. A tangible machine-readable storage medium comprising instructions that, when executed, cause a machine to, at least:

determine a number of pilot valves of a control module, the control module being operatively coupled to an actuator, the actuator being operatively coupled to a valve having a flow control member; and in response to determining that the number of pilot valves is equal to one, determine whether a failure configuration of the actuator is a fail to close configuration or a fail to open configuration by:

determining a first position value measured in response to moving the flow control member in a first direction to a first position;

determining a second position value measured in response to moving the flow control member in a second direction opposite the first direction to a second position; and comparing the first and second position values.

16. The machine-readable storage medium of claim 15, wherein the instructions, when executed, cause the machine, in response to determining that the number of pilot valves is equal to two, to determine that the failure configuration of the actuator is a fail in last position configuration.

17. The machine-readable storage medium of claim 15, wherein the instructions, when executed, cause the machine to:

determine a failure configuration of the control module; and compare the failure configuration of the control module to the failure configuration of the actuator to determine the existence of a failure configuration mismatch between the control module and the actuator.

18. The machine-readable storage medium of claim 15, wherein the instructions, when executed, further cause the machine to determine whether the failure configuration of the actuator is a fail to close configuration or a fail to open configuration by:

determining a movement range associated with moving the flow control member from the first position to the second position, the movement range being based on the comparing of the first and second position values;

comparing the movement range to a movement range threshold; and generating an error notification in response to determining that the movement range fails to satisfy the movement range threshold.

19. The machine-readable storage medium of claim 15, wherein the instructions, when executed, further cause the machine to determine whether the failure configuration of the actuator is a fail to close configuration or a fail to open configuration by:

determining a third position value in response to moving the flow control member in the first direction to the first position, the first and third position values being based on separate instances of moving the flow control member to the first position;

determining a standard deviation associated with the first and third position values;

comparing the standard deviation to a repeatability threshold; and generating an error notification in response to determining that the standard deviation fails to satisfy the repeatability threshold.

20. The machine-readable storage medium of claim 15, wherein the instructions, when executed, cause the machine to:

activate a first pilot valve of the control module in connection with determining the first position value; and deactivate the first pilot valve of the control module in connection with determining of the second position value.

21. The machine-readable storage medium of claim 15, wherein the instructions, when executed, further cause the machine to determine whether the failure configuration of the actuator is a fail to close configuration or a fail to open configuration by associating a pneumatic status of one of the control valves with a corresponding one of the first and second positions of the flow control member based on correlation data and further based on the comparison of the first and second position values.

* * * * *

UNITED STATES PATENT AND TRADEMARK OFFICE
CERTIFICATE OF CORRECTION

PATENT NO. : 10,619,758 B2
APPLICATION NO. : 15/532462
DATED : April 14, 2020
INVENTOR(S) : Zhang et al.

Page 1 of 1

It is certified that error appears in the above-identified patent and that said Letters Patent is hereby corrected as shown below:

In the Claims

Column 35, Claim 9, Line 17, replace "wherein the wherein the" with --wherein the--

Column 35, Claim 13, Line 66, replace "determining of the" with --determining the--

Column 37, Claim 20, Line 13, replace "determining of the" with --determining the--

Signed and Sealed this
Fifteenth Day of September, 2020

Andrei Iancu
*Director of the United States Patent and Trademark Office*